(12) United States Patent
Ise et al.

(10) Patent No.: US 8,730,594 B2
(45) Date of Patent: May 20, 2014

(54) IMAGE PICKUP LENS FOR SOLID-STATE IMAGE PICKUP ELEMENT

(71) Applicant: Kantatsu Co., Ltd., Yaita (JP)

(72) Inventors: Yoshio Ise, Sukagawa (JP); Masaya Hashimoto, Sukagawa (JP)

(73) Assignee: Kantatsu Co., Ltd., Yaita-shi, Tochigi (JP)

( * ) Notice: Subject to any disclaimer, the term of this patent is extended or adjusted under 35 U.S.C. 154(b) by 0 days.

(21) Appl. No.: 13/677,484

(22) Filed: Nov. 15, 2012

(65) Prior Publication Data
US 2013/0070348 A1 Mar. 21, 2013

Related U.S. Application Data

(63) Continuation of application No. PCT/JP2011/061264, filed on May 17, 2011.

(30) Foreign Application Priority Data

May 17, 2010 (JP) .................................. 2010-112980
May 12, 2011 (JP) .................................. 2011-107602

(51) Int. Cl.
*G02B 9/34* (2006.01)
*G02B 3/02* (2006.01)

(52) U.S. Cl.
CPC ...................................... *G02B 9/34* (2013.01)
USPC ............................................ 359/773; 359/715

(58) Field of Classification Search
USPC .................... 359/715, 771, 772, 773
See application file for complete search history.

(56) References Cited

U.S. PATENT DOCUMENTS

| | | | |
|---|---|---|---|
| 8,116,014 B2 * | 2/2012 | Taniyama | 359/773 |
| 2008/0180816 A1 | 7/2008 | Nakamura | |
| 2010/0053776 A1 | 3/2010 | Tanaka et al. | |
| 2010/0103533 A1 | 4/2010 | Taniyama | |

FOREIGN PATENT DOCUMENTS

| | | |
|---|---|---|
| JP | 2007-286153 A | 11/2007 |
| JP | 2008-046526 A | 2/2008 |

(Continued)

OTHER PUBLICATIONS

International Search Report for PCT/JP2011/061264, mailing date of Aug. 16, 2011.

*Primary Examiner* — Jack Dinh
(74) *Attorney, Agent, or Firm* — Westerman, Hattori, Daniels & Adrian, LLP

(57) ABSTRACT

An image pickup lens for a solid-state image pickup element includes a first lens having a positive refractive power with a convex surface facing the object side, a second lens with concave surfaces facing the object side and an image side, a third lens of a meniscus shape having a positive refractive power with a convex surface facing the image side, and a fourth lens with concave surfaces facing the object side and the image side, wherein the image pickup lens satisfies the following conditional expressions (1),(2),(5),and(7);

$$-1.3 < r1/r2 < 0.03 \qquad (1)$$

$$0.09 < r6/r5 < 1.0 \qquad (2)$$

$$-0.16270 \leq r8/r7 \leq -0.0049871 \qquad (5)$$

$$0.38659694 \leq f3/f \leq 0.565293 \qquad (7)$$

where
r1, r2: curvature radius of the first lens;
r5, r6: curvature radius of the third lens;
r7, r8: curvature radius of the fourth lens;
f: composite focal length of an overall image pickup lens system; and
f3: focal length of the third lens.

9 Claims, 18 Drawing Sheets

(56) References Cited

FOREIGN PATENT DOCUMENTS

| JP | 2008-185880 A | 8/2008 |
|---|---|---|
| JP | 2008-242180 A | 10/2008 |
| JP | 2009-014899 A | 1/2009 |
| JP | 2009-069194 A | 4/2009 |
| JP | 2009-069195 A | 4/2009 |
| JP | 2009-069196 A | 4/2009 |
| JP | 2009-151113 A | 7/2009 |
| JP | 2010-079296 A | 4/2010 |
| JP | 2010-102162 A | 5/2010 |

* cited by examiner

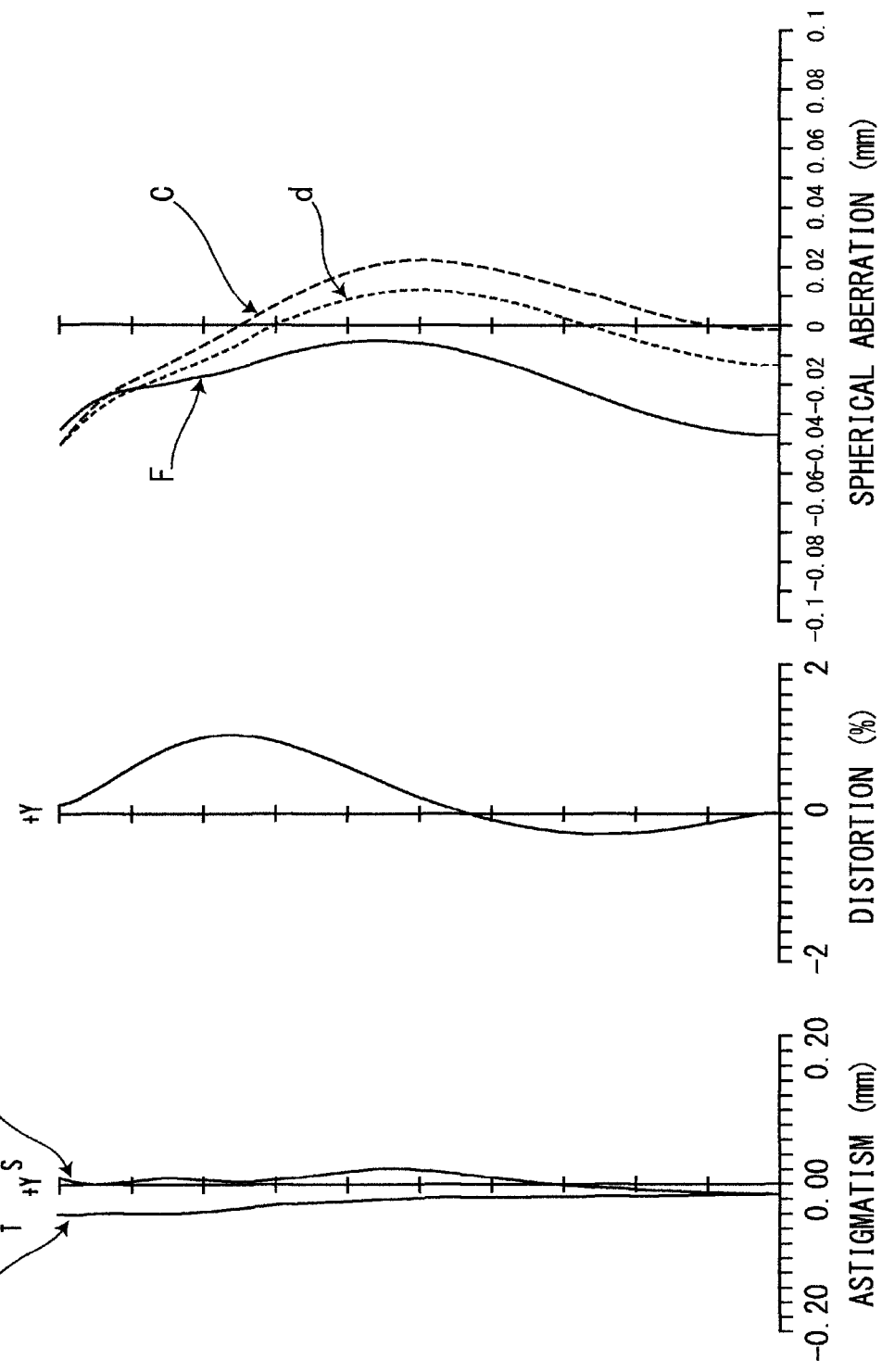

IMAGE PICKUP LENS FOR SOLID-STATE IMAGE PICKUP ELEMENT

CROSS REFERENCE TO RELATED APPLICATION

This application is a continuation of International Application No. PCT/JP2011/061264 filed on May 17, 2011, the contents of which are incorporated herein by reference.

The present application is based on and claims priority of Japanese Patent Application Nos. 2010-112980 filed on May 17, 2010, and 2011-107602 filed on May 12, 2011, the entire contents of which are hereby incorporated by reference.

BACKGROUND OF THE INVENTION

1. Field of the Invention

The present invention relates to an image pickup lens for a solid-state image pickup element which is used in a small-sized imaging device for a small-sized, thin electronic device.

Specifically, the present invention relates to an image pickup lens for a solid-state image pickup element which is used in a small-sized imaging device for small-sized, thin electronic devices such as a portable terminal, a PDA (Personal Digital Assistant) and the like.

2. Description of the Related Art

In recent years, accompanying the increase in the market of portable terminals equipped with the imaging device, small-sized solid-state image pickup elements with a high number of pixels are mounted to the imaging devices. Corresponding to the downsizing and increase in the number of pixels of the imaging element, the image pickup lens is required to have higher performance in view of resolution and image quality, and with wide use thereof, the image pickup lens is also requested to reduce cost.

In order to satisfy such trend for improving performance, the image pickup lens configured from a plurality of lenses is becoming popular. And, in comparison with the lens configuration of two to three lenses, the image pickup lens of a four-lens configuration which is capable of improving performance than in the lens configuration of two to three lenses is also being proposed.

For example, in Japanese Patent Application Laid-Open No. 2007-286153 (Patent document 1), Japanese Patent Application Laid-Open No. 2008-046526 (Patent document 2), and Japanese Patent Application Laid-Open No. 2008-242180 (Patent document 3), there are disclosed an image pickup lens including, in order from an object side, an aperture stop, a first lens having a positive refractive power, a second lens having a negative refractive power, a third lens having a positive refractive power, and a fourth lens having a negative refractive power with at least one surface thereof being an aspheric surface, aiming at improving performance.

Further, in Japanese Patent Application Laid-Open No. 2009-14899 (Patent document 4), there is disclosed an image pickup lens including, in order from the object side, an aperture stop, a first lens having a positive refractive power with a biconvex shape, a second lens of a meniscus shape having a negative refractive power with a convex surface facing the object side, a third lens of a meniscus shape having a positive refractive power with a convex surface facing an image side, and a fourth lens of a meniscus shape having a negative refractive power with a convex surface facing the object side, aiming at improving performance.

Although the image pickup lenses disclosed in the Patent documents 1 to 4 aim at improving performance by taking the four-lens configuration, it is not sufficient for downsizing and slimming, or correction of various aberrations.

SUMMARY OF THE INVENTION

The present invention has been made in view of the above situations, and aims at obtaining an image pickup lens which has short total track length (TTL), is capable of downsizing, and is capable of correcting various aberrations, has high performance, and corresponds to cost reduction. The present invention is a buildup of supplementing specific embodiments since the invention of the basic idea, and is applied herein as an invention collectively.

An image pickup lens for a solid-state image pickup element of the present invention includes, in order from an object side, a first lens having a positive refractive power with a convex surface facing the object side in the vicinity of an optical axis, a second lens of a biconcave lens shape facing concave surfaces to the object side and an image side in the vicinity of the optical axis, a third lens of a meniscus shape having a positive refractive power with a convex surface facing the image side in the vicinity of the optical axis, and a fourth lens of a biconcave lens shape facing concave surfaces to the object side and the image side in the vicinity of the optical axis, characterized in that the image pickup lens satisfies the following conditional expressions (1), (2), (5), and (7):

$$-1.3 < r1/r2 < 0.03 \tag{1}$$

$$0.09 < r6/r5 < 1.0 \tag{2}$$

$$-0.16270 \leq r8/r7 \leq -0.0049871 \tag{5}$$

$$0.38659694 \leq f3/f \leq 0.565293 \tag{7}$$

where
r1: a curvature radius of the object side surface of the first lens;
r2: a curvature radius of the image side surface of the first lens;
r5: a curvature radius of the object side surface of the third lens;
r6: a curvature radius of the image side surface of the third lens;
r7: a curvature radius of the object side surface of the fourth lens;
r8: a curvature radius of the image side surface of the fourth lens;
f: a composite focal length of an overall image pickup lens system; and
f3: a focal length of the third lens.

Further, the image pickup lens for the solid-state image pickup element of the present invention is characterized in that an aperture stop is arranged on the object side of the first lens.

Further, the image pickup lens for the solid-state image pickup element of the present invention is characterized in that the image side surface of the second lens has an aspheric shape changing uniformly without having an inflection point from a center of the lens to a periphery thereof.

Further, the image pickup lens for the solid-state image pickup element of the present invention is characterized in that the object side surface of the fourth lens has an aspheric shape changing uniformly without having an inflection point from a center of the lens to a periphery thereof.

Further, the image pickup lens for the solid-state image pickup element of the present invention is characterized in that the second lens satisfies the following conditional expression (3):

$$-2.05<f2/f<-0.5 \quad (3)$$

where f: the composite focal length of the overall image pickup lens system; and f2: a focal length of the second lens.

Further, the image pickup lens for the solid-state image pickup element of the present invention is characterized in that the fourth lens satisfies the following conditional expression (4):

$$-1.2<f4/f<-0.35 \quad (4)$$

where f: the composite focal length of the overall image pickup lens system; and f4: a focal length of the fourth lens.

Further, the image pickup lens for the solid-state image pickup element of the present invention is characterized in that the second lens and the fourth lens further satisfy both the following conditional expressions (3) and (4):

$$-2.05<f2/f<-0.5 \quad (3)$$

$$-1.2<f4/f<-0.35 \quad (4)$$

where f: the composite focal length of the overall image pickup lens system;

f2: the focal length of the second lens; and f4: the focal length of the fourth lens.

Further, the image pickup lens for the solid-state image pickup element of the present invention is characterized in that the first lens satisfies the following conditional expression (6):

$$0.4<f1/f<0.8 \quad (6)$$

where f: the composite focal length of the overall image pickup lens system; and f1: a focal length of the first lens.

Further, the image pickup lens for the solid-state image pickup element of the present invention is characterized in that the second lens satisfies the following conditional expression (8), with respect to the curvature radius of the object side and the image side:

$$-2.0<r4/r3<0.0 \quad (8)$$

where r3: a curvature radius of the object side surface of the second lens; and r4: a curvature radius of the image side surface of the second lens.

Further, the image pickup lens for the solid-state image pickup element of the present invention is characterized in that the image pickup lens satisfies the following conditional expression (9), with respect to a total track length and the focal length of the imaging optical system:

$$1.03<L/f<1.4 \quad (9)$$

where

L: a distance from the object side surface of the first lens to an image plane on the optical axis (air-converted distance excluding a plane-parallel glass); and f: the composite focal length of the overall image pickup lens system.

Further, the image pickup lens for the solid-state image pickup element of the present invention is characterized in that the first lens, the second lens, the third lens, and the fourth lens have at least one surface thereof formed into an aspheric shape, and are so-called plastic lenses produced from a synthetic resin material.

BRIEF DESCRIPTION OF THE DRAWINGS

FIG. 18 shows various aberration diagrams which the image pickup lens of the solid-state image pickup element of embodiment 4(c) of the present invention aims to achieve.

DETAILED DESCRIPTION OF THE PREFERRED EMBODIMENT

Figure 1:
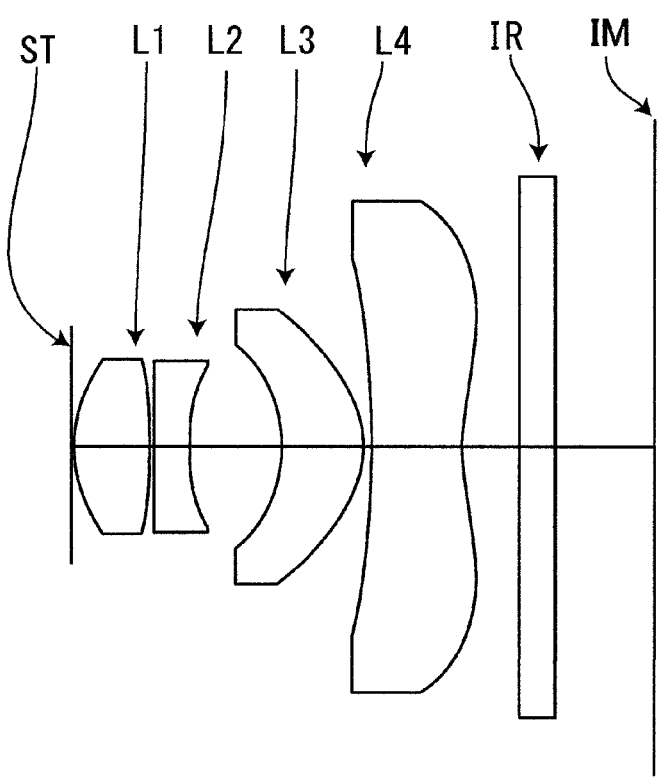
FIG. 1 is a cross-sectional view of an image pickup lens for a solid-state image pickup element related to embodiment 1(a) and embodiment 1(b) as a first embodiment.

The present invention for solving the above-mentioned problem may solve the problem by making the image pickup lens of a below-described configuration.

The present invention is an image pickup lens for a solid-state image pickup element, including, in order from an object side, a first lens having a positive refractive power with a convex surface facing the object side in the vicinity of an optical axis, a second lens of a biconcave lens shape facing concave surfaces to the object side and an image side in the vicinity of the optical axis, a third lens of a meniscus shape having a positive refractive power with a convex surface facing the image side in the vicinity of the optical axis, and a fourth lens of a biconcave lens shape facing concave surfaces to the object side and the image side in the vicinity of the optical axis, wherein the image pickup lens satisfies the following conditional expressions (1),(2), (5), and (7):

$$-1.3 < r1/r2 < 0.03 \quad (1)$$

$$0.09 < r6/r5 < 1.0 \quad (2)$$

$$-0.16270 \leq r8/r7 \leq -0.0049871 \quad (5)$$

$$0.38659694 \leq f3/f \leq 0.565293 \quad (7)$$

where
r1: a curvature radius of the object side surface of the first lens;
r2: a curvature radius of the image side surface of the first lens;
r5: a curvature radius of the object side surface of the third lens;
r6: a curvature radius of the image side surface of the third lens;
r7: a curvature radius of the object side surface of the fourth lens;
r8: a curvature radius of the image side surface of the fourth lens;
f: a composite focal length of an overall image pickup lens system; and
f3: a focal length of the third lens.

The conditional expression (1) is for stipulating a lens shape of the first lens. If the value is below the lower limit of the conditional expression (1), the positive power of the image side surface of the first lens becomes too strong, and the generation of spherical aberrations in this surface becomes large so that it becomes difficult to secure sufficient axial performance. In contrast, if the value exceeds the upper limit thereof, the first lens takes meniscus shape. However, if the value is within the conditional expression (1), then a problem that the positive power on the object side surface becomes too strong, so that it becomes the lens having the surface on the object side with high error sensitivity, is not likely to occur.

With respect to the conditional expression (1), supplemental embodiments disclosed that more reliable effect may be expected, in embodiments in the range of the following conditional expression (1a):

$$-1.0 < r1/r2 < 0.0 \quad (1a)$$

The conditional expression (2) is for stipulating a lens shape of the third lens. If the value is below the lower limit of the conditional expression (2), the positive power of the third lens increases so that the shortening of the total track length is not possible, going against downsizing and slimming of the image pickup lens which is one of the objectives of the present invention. In contrast, if the value exceeds the upper limit thereof, the positive power of the third lens becomes too week, so that the balance between the axial performance and off-axial performance becomes lost, and it becomes difficult to secure performance.

With respect to the conditional expression (2), supplemental embodiments disclosed that more reliable effect may be expected, in embodiments in the range of the following conditional expression (2a).

$$0.12 < r6/r5 < 1.0 \quad (2a)$$

The conditional expression (5) is for stipulating the lens shape of the fourth lens. If the value is below the lower limit of the conditional expression (5), a negative power of the object side surface of the fourth lens becomes too strong, so that the balance between the axial performance and the off-axial performance becomes lost, and it becomes difficult to secure performance. In contrast, if the value exceeds the upper limit thereof, the fourth lens shape becomes a meniscus shape, numerous conventional problems of the lens configuration remain, so that it is not possible to achieve the lens shape capable of maintaining the high performance intended by the present invention and implementing low cost.

The conditional expression (7) is for stipulating the focal length range of the third lens with respect to the focal length of an overall optical system. If the value is below the lower limit of the conditional expression (7), the focal length of the third lens becomes too short, so that it becomes difficult to correct the coma aberration and the astigmatism. Such lens has high error sensitivity so that high accuracy is required when manufacturing. In contrast, if the value exceeds the upper limit thereof, the power of the third lens becomes insufficient so that the correction of the off-axial aberration becomes insufficient.

The aperture stop is arranged on the object side of the first lens. By providing the aperture stop at the object side of the first lens, it becomes easier to decrease a CRA (Chief Ray Angle), and becomes easier to secure light amount at the periphery of an image plane where light amount drops.

The image side surface of the second lens has an aspheric shape changing uniformly without having an inflection point from a center of the lens to a periphery thereof. The object side surface of the fourth lens has an aspheric shape changing uniformly without having an inflection point from a center of the lens to a periphery thereof. By making the image side surface of the second lens and the object side surface of the fourth lens in the aspheric shape which changes uniformly without having inflection points, it becomes possible to manufacture the lens with higher surface accuracy. Further, if the inflection point exists on the image side of the second lens or the object side of the fourth lens, numerous conventional problems of the lens shape remain, so that it is not possible to achieve the lens shape capable of maintaining the high performance intended by the present invention and implementing low cost.

Further, the second lens satisfies the following conditional expression (3):

$$-2.05 < f2/f < -0.5 \quad (3)$$

where
f: the composite focal length of the overall image pickup lens system; and
f2: the focal length of the second lens.

With respect to the conditional expression (3), supplemental embodiments disclosed that more reliable effect may be expected, in embodiments in the range of the following conditional expression (3a):

$$-1.3 < f2/f < -0.5 \quad (3a)$$

Further, the fourth lens satisfies the following conditional expression (4):

$$-1.2 < f4/f < -0.35 \quad (4)$$

where
f: the composite focal length of the overall image pickup lens system; and
f4: a focal length of the fourth lens.

With respect to the conditional expression (4), supplemental embodiments disclosed that more reliable effect may be expected, in embodiments in the range of the following conditional expression (4a):

$$-0.95 < f4/f < -0.35 \tag{4a}$$

Further, as a favorable embodiment, the second lens and the fourth lens satisfy both the following conditional expressions (3) and (4) at the same time:

$$-2.05 < f2/f < -0.5 \tag{3}$$

$$-1.2 < f4/f < -0.35 \tag{4}$$

where
f: the composite focal length of the overall image pickup lens system;
f2: the focal length of the second lens; and
f4: the focal length of the fourth lens.

The conditional expression (3) is for stipulating the focal length range of the second lens with respect to the focal length of the overall optical system. If the value exceeds the upper limit of the conditional expression (3), the focal length of the second lens becomes too long, so that it becomes difficult to correct axial chromatic aberration. In contrast, if the value is below the lower limit thereof, the focal length of the second lens becomes too short, so that it becomes difficult to correct spherical aberration and coma aberration. In either case, the desired optical performance cannot be obtained.

The conditional expression (4) is for stipulating the focal length range of the fourth lens with respect to the focal length of the overall optical system. If the value exceeds the upper limit of the conditional expression (4), the total track length becomes longer, so that it goes against downsizing and slimming of the image pickup lens which is the objectives of the present invention. In contrast, if the value is below the lower limit thereof, the focal length of the fourth lens becomes too short, so that it becomes difficult to secure the off-axial performance, and error sensitivity characteristics at portion where image height is low deteriorate.

With respect to the conditional expressions (3) and (4), supplemental embodiments disclosed that more reliable effect may be expected, in embodiments in the range of the following conditional expressions (3a) and (4a):

$$-1.3 < f2/f < -0.5 \tag{3a}$$

$$-0.95 < f4/f < -0.35 \tag{4a}$$

Further, the first lens satisfies the following conditional expression (6):

$$0.4 < f1/f < 0.8 \tag{6}$$

where
f: the composite focal length of the overall image pickup lens system; and
f1: a focal length of the first lens.

With respect to the conditional expression (6), supplemental embodiments disclosed that more reliable effect may be expected, in embodiments in the range of the following conditional expression (6a):

$$0.4 < f1/f < 0.75 \tag{6a}$$

The conditional expression (6) is for stipulating the focal length range of the first lens with respect to the focal length of the overall optical system. If the value is below the lower limit of the conditional expression (6), the focal length of the first lens becomes too short, so that it becomes difficult to correct the spherical aberration and the coma aberration. In contrast, if the value exceeds the upper limit thereof, the total track length becomes too long, so that it is against downsizing and slimming of the image pickup lens which is the objectives of the present invention.

Further, with respect to the curvature radius of the object side and the image side, the second lens satisfies the following conditional expression (8):

$$-2.0 < r4/r3 < 0.0 \tag{8}$$

where
r3: a curvature radius of the object side surface of the second lens; and
r4: a curvature radius of the image side surface of the second lens.

The conditional expression (8) is for stipulating the lens shape of the second lens. If the value is below the lower limit of the conditional expression (8), a negative power of the object side surface of the second lens becomes too strong, giving severe error sensitivity. Such lens is low in productivity. In contrast, if the value exceeds the upper limit thereof, the second lens shape becomes a meniscus shape, numerous conventional problems of the lens configuration remain, so that it is not possible to achieve the lens shape capable of maintaining the high performance intended by the present invention and implementing low cost.

Further, with respect to the total track length and the focal length of the image pickup lens system, the image pickup lens system satisfies the following conditional expression (9):

$$1.03 < L/f < 1.4 \tag{9}$$

where
L: a distance from the object side surface of the first lens to the image plane on the optical axis (air-converted distance excluding a plane-parallel glass); and
f: the composite focal length of the overall image pickup lens system.

The conditional expression (9) is for stipulating the total track length in relation to the focal length. If the value is below the lower limit of the conditional expression (9), the total track length becomes too short, so that it becomes difficult to correct various aberrations, and the error sensitivity during manufacturing becomes too severe. In contrast, if the value exceeds the upper limit thereof, the total track length becomes too long, so that it is against downsizing and slimming of the image pickup lens which is the objectives of the present invention.

With respect to the conditional expression (9), supplemental embodiments disclosed that more reliable effect may be expected, in embodiments in the range of the following conditional expression (9a):

$$1.03 < L/f < 1.25 \tag{9a}$$

In the present invention, the first lens, the second lens, the third lens, and the fourth lens have at least one surface thereof taking an aspheric shape, and are so-called plastic lenses manufactured from a resin material. As such, it becomes possible to reduce cost by using the resin material which is inexpensive and have good production efficiency, and performance improvement is also achieved by adopting the aspheric surface.

Embodiments

Figure 9:
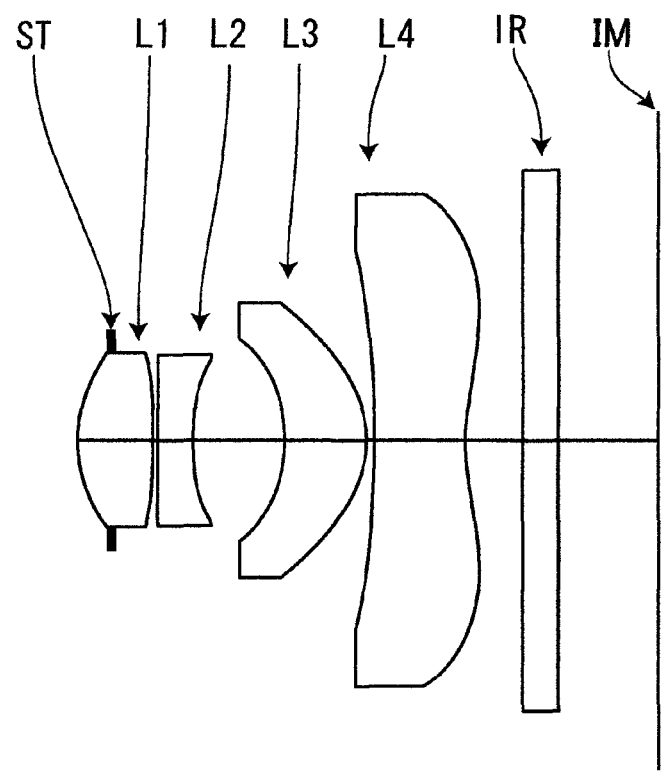
FIG. 9 is a schematic view showing a positional relationship between an aperture stop and the first lens in embodiment 3(a) and embodiment 3(b)
Figure 10:
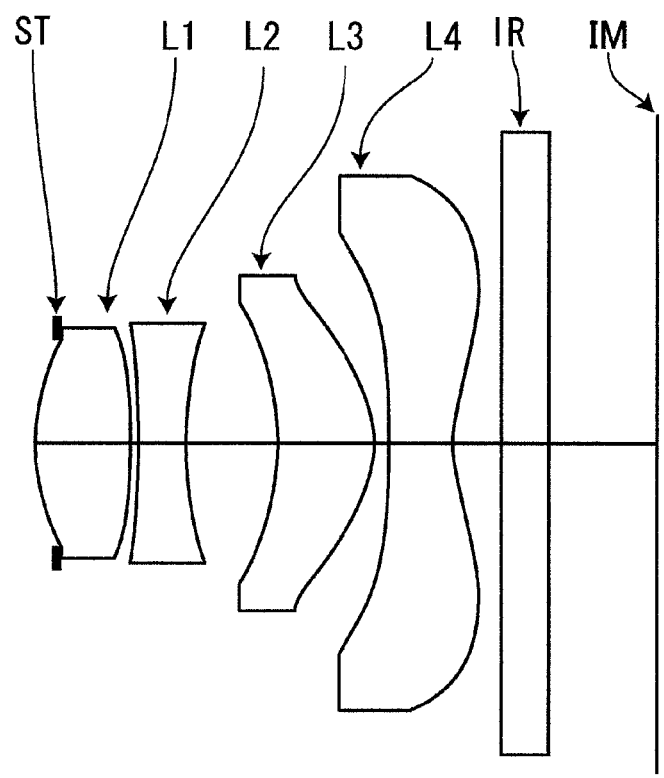
FIG. 10 is a schematic view showing a positional relationship between the aperture stop and the first lens in embodiment 4(a) and embodiment 4(b)

Hereinafter, embodiments of the present invention will be explained by presenting specific numeric values. Embodiments (a) (b) (c) in each of a first embodiment to a fourth embodiment include, in order from the object side, an aperture stop ST, a first lens L1, a second lens L2, a third lens L3, a fourth lens L4, a plane-parallel glass IR, and an image plane IM. Further, the aperture stop ST in the first embodiment and the second embodiment is set at the object side surface of the first lens (FIG. 9), and the aperture stop ST in the third embodiment and the fourth embodiment is set at a position on the image side than the object side surface of the first lens (FIG. 10).

Further, as for the aspheric shape adopted in each embodiment, when an apex of the surface is the origin, an optical axis direction is taken as Z-axis, and a height in a direction perpendicular to the optical axis is h, the shape is represented by the following aspheric expression.

$$Z=(h^2/r)/[1+\{1-(1+K)(h^2/r^2)\}^{1/2}]+A_4h^4+A_6h^6+A_8h^8+ \ldots$$

References used in the aspheric expression and in each embodiment are as follows.
Ai: i-th aspheric coefficient
r: curvature radius
K: conic constant
f: focal length of overall image pickup lens system
F: F number
d: distance between lens surfaces along axis
nd: index of refraction with respect to d-ray of lens material
vd: Abbe number with respect to d-ray of lens material
ω: half field of view Further, in the following (including lens data in tables), the number of exponential in decimal (for example, 4.5 times $10^{-04}$) is expressed using E (for example, 4.5E-04), and the surface number of the lens data is provided in sequence taking the object side of the first lens as a first surface.

[Embodiment 1]

Figure 2:
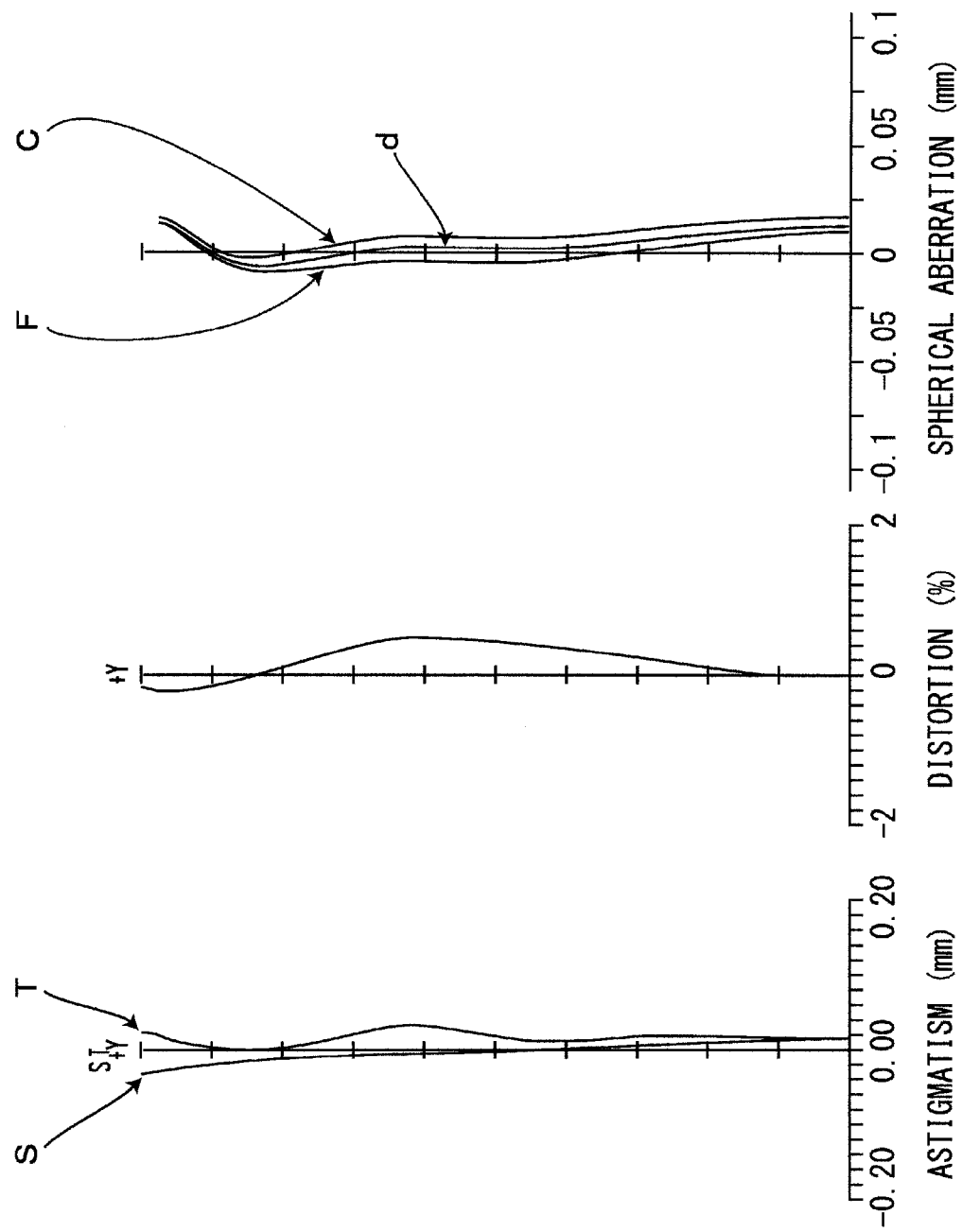
FIG. 2 shows various aberration diagrams which the image pickup lens of the solid-state image pickup element of the first embodiment of the present invention aims to achieve.

Numerical data for the image pickup lens of the embodiment 1(a) of the first embodiment will be shown in Table 1. Further, FIG. 1 is a cross-sectional view of the image pickup lens, and FIG. 2 shows various aberration diagrams of the image pickup lens. FIG. 2 shows spherical aberration (mm), astigmatism (mm), and distortion (%) respectively. In these aberration diagrams, the spherical aberration diagram shows the aberration amount with respect to each wavelength of F-ray (486 nm), d-ray (588 nm), and C-ray (656 nm), and the astigmatism diagram shows the aberration amount at a sagittal image surface S and the aberration amount at a tangential image surface T, respectively. The same applies to FIGS. 4, 6, 8, 12, 14, 16, and 18.

TABLE 1

| | f = 4.390 F = 2.8 | | | | |
|---|---|---|---|---|---|
| Surface Number | r | d | nd | vd | K |
| 1(ST) | 1.375232 | 0.645017 | 1.525120 | 56.2669 | 0 |
| 2 | −6.06052 | 0.04 | | | 0 |
| 3 | −10.8074 | 0.3 | 1.614220 | 25.5765 | 0 |
| 4 | 2.654898 | 0.78429 | | | 6.0060 |
| 5 | −1.55531 | 0.692462 | 1.544135 | 55.9763 | 0 |
| 6 | −1.02748 | 0.076694 | | | −0.68783 |
| 7 | −800 | 0.763843 | 1.525120 | 56.2669 | 0 |
| 8 | 1.878875 | 0.5 | | | −12.101 |
| 9 | Infinity | 0.3 | 1.516798 | 64.1983 | 0 |
| 10 | Infinity | 0.852534 | | | 0 |

| Surface Number | A4 | A6 | A8 | A10 | A12 | A14 | A16 |
|---|---|---|---|---|---|---|---|
| 1(ST) | −0.00764 | −0.00401 | −0.10776 | 0.204907 | −0.24302 | 0 | 0 |
| 2 | 0.145123 | −0.41024 | 0.141955 | 0.31407 | −0.42716 | 0 | 0 |
| 3 | 0.226098 | −0.47153 | 0.322264 | 0.265614 | −0.68757 | 0 | 0 |
| 4 | 0.117334 | −0.0792 | −0.05889 | 0.434044 | −0.31768 | 0 | 0 |
| 5 | −0.02188 | −0.16725 | 0.129352 | 0.064207 | −0.03881 | 0 | 0 |
| 6 | 0.103207 | −0.10095 | 0.072328 | 0.009919 | −0.01616 | 0 | 0 |
| 7 | −0.10929 | 0.085317 | −0.03104 | 0.004488 | 0.000634 | −0.00036 | 4.16E−05 |
| 8 | −0.0865 | 0.043088 | −0.0189 | 0.00545 | −0.00095 | 8.89E−05 | −3.6E−06 |

The numerical data of the image pickup lens of the embodiment 1(b) of the first embodiment is shown in Table 5. Further, FIG. 1 is a cross-sectional view of the image pickup lens, and FIG. 2 shows various aberration diagrams.

TABLE 5

| | f = 4.390 F = 2.8 ω = 32.982° | | | | |
|---|---|---|---|---|---|
| Surface Number | r | d | nd | vd | K |
| 1(ST) | 1.375232 | 0.6450167 | 1.52512 | 56.2669 | 0 |
| 2 | −6.060523 | 0.04 | | | 0 |
| 3 | −10.8074 | 0.3 | 1.61422 | 25.5765 | 0 |
| 4 | 2.654898 | 0.7842902 | | | 6.006092 |
| 5 | −1.555308 | 0.6924621 | 1.544135 | 55.9763 | 0 |
| 6 | −1.027475 | 0.0766941 | | | −0.687831 |
| 7 | −800 | 0.7638432 | 1.52512 | 56.2669 | 0 |
| 8 | 1.878875 | 0.5 | | | −12.10104 |

TABLE 5-continued f = 4.390 F = 2.8 ω = 32.982°

| | | | | | |
|---|---|---|---|---|---|
| 9 | Infinity | 0.3 | 1.516798 | 64.1983 | 0 |
| 10 | Infinity | 0.8525338 | | | 0 |

| Surface Number | A4 | A6 | A8 | A10 | A12 | A14 | A16 |
|---|---|---|---|---|---|---|---|
| 1(ST) | −0.00764 | −0.004013 | −0.10776 | 0.2049069 | −0.243023 | 0 | 0 |
| 2 | 0.1451231 | −0.41024 | 0.1419555 | 0.3140697 | −0.427157 | 0.1001246 | 0 |
| 3 | 0.2260983 | −0.47153 | 0.3222643 | 0.2656138 | −0.687565 | 0.8087303 | −0.444821 |
| 4 | 0.1173338 | −0.079198 | −0.058889 | 0.4340439 | −0.317682 | 0.1784135 | −0.223889 |
| 5 | −0.021877 | −0.167251 | 0.1293524 | 0.0642069 | −0.038812 | −0.170191 | 0.0324237 |
| 6 | 0.1032069 | −0.100954 | 0.0723282 | 0.0099194 | −0.016158 | 0 | 0 |
| 7 | −0.10929 | 0.0853168 | −0.031043 | 0.0044879 | 0.0006342 | −0.000364 | 4.156E−05 |
| 8 | −0.086496 | 0.0430877 | −0.018903 | 0.0054503 | −0.000949 | 8.892E−05 | −3.63E−06 |

Figure 11:
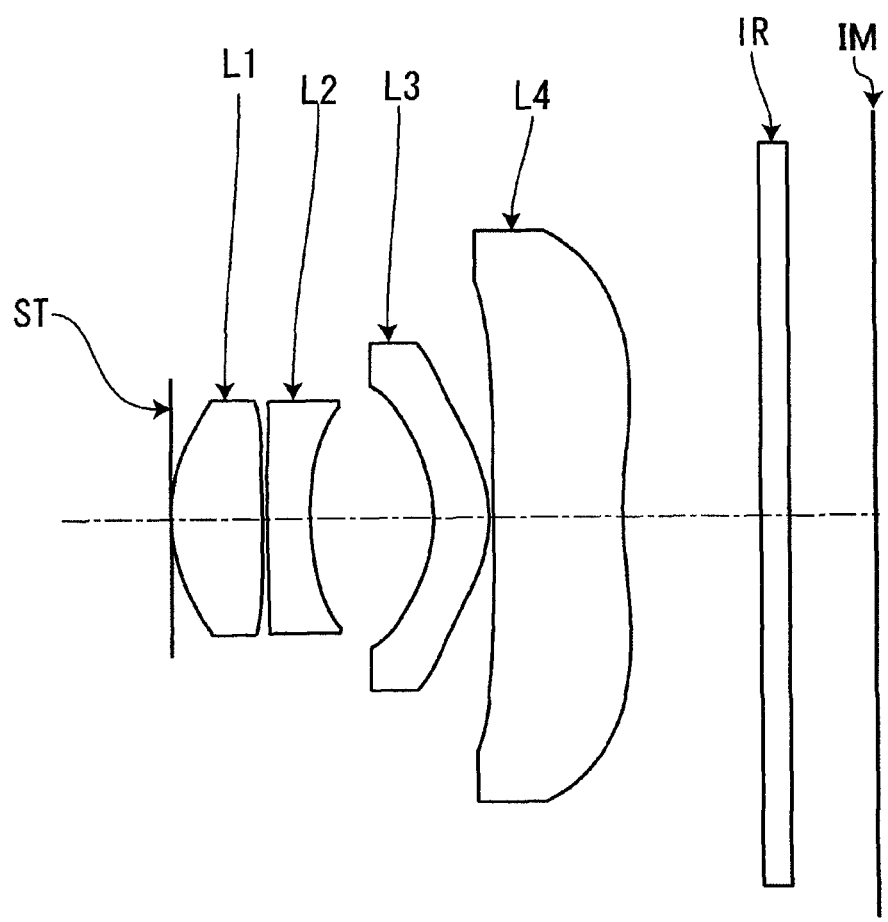
FIG. 11 is a cross-sectional view of the image pickup lens for the solid-state image pickup element related to embodiment 1(c) as the first embodiment.
Figure 12:
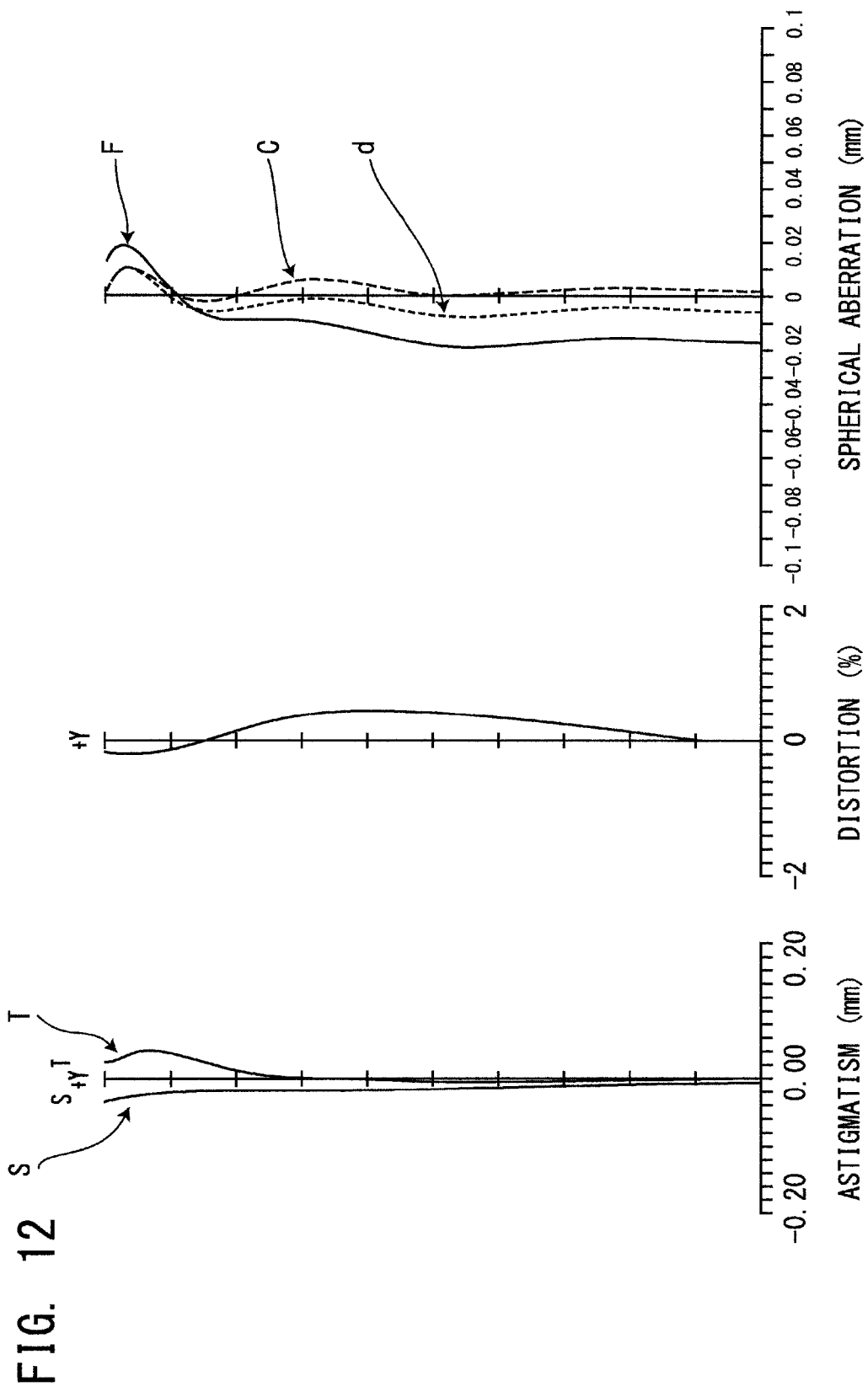
FIG. 12 shows various aberration diagrams which the image pickup lens of the solid-state image pickup element of embodiment 1(c) of the present invention aims to achieve.

The numerical data of the image pickup lens of the embodiment 1(c) of the first embodiment is shown in Table 9. Further, FIG. 11 is a cross-sectional view of the image pickup lens, and FIG. 12 shows various aberration diagrams.

TABLE 9 f = 4.65 F = 2.85 ω = 31.63°

| Surface Number | r | d | nd | νd | K |
|---|---|---|---|---|---|
| 1(ST) | 1.3095 | 0.633 | 1.5346 | 56.2 | 0 |
| 2 | −19.7311 | 0.039 | | | 0 |
| 3 | −50 | 0.3 | 1.6142 | 25.6 | 0 |
| 4 | 2.5132 | 0.856 | | | −4.234 |
| 5 | −1.0739 | 0.388 | 1.5441 | 56.0 | 0 |
| 6 | −0.9429 | 0.03 | | | −3.137 |
| 7 | −95 | 0.903 | 1.5346 | 56.2 | 0 |
| 8 | 3.027 | 0.96 | | | −37.29 |
| 9 | Infinity | 0.2 | 1.5168 | 64.2 | 0 |
| 10 | Infinity | 0.607483722 | | | 0 |

| Surface Number | A4 | A6 | A8 | A10 | A12 | A14 | A16 |
|---|---|---|---|---|---|---|---|
| 1 | −8.786E−03 | 3.879E−02 | −2.096E−01 | 3.845E−01 | −3.291E−01 | 0.000E+00 | 0.000E+00 |
| 2 | 5.580E−02 | −1.608E−01 | −3.442E−02 | 6.956E−02 | −1.361E−01 | 9.906E−02 | 0.000E+00 |
| 3 | 1.228E−01 | −2.021E−01 | 3.262E−02 | 1.796E−01 | −5.564E−01 | 7.903E−01 | −2.849E−01 |
| 4 | 1.741E−01 | 2.556E−02 | −1.799E−01 | 5.624E−01 | −3.864E−01 | −1.414E−01 | 5.274E−01 |
| 5 | 1.805E−01 | −1.446E−01 | 4.994E−01 | 1.596E−01 | −2.511E+00 | 3.589E+00 | −1.725E+00 |
| 6 | −9.122E−02 | 1.526E−01 | 1.709E−02 | −9.295E−02 | 2.856E−02 | 0.000E+00 | 0.000E+00 |
| 7 | −1.083E−02 | 2.998E−03 | −1.529E−02 | 1.985E−02 | −1.053E−02 | 2.437E−03 | −2.052E−04 |
| 8 | −7.490E−02 | 2.594E−02 | −7.823E−03 | 2.068E−04 | 5.297E−04 | −1.282E−04 | 8.080E−06 |

[Embodiment 2]

Figure 3:
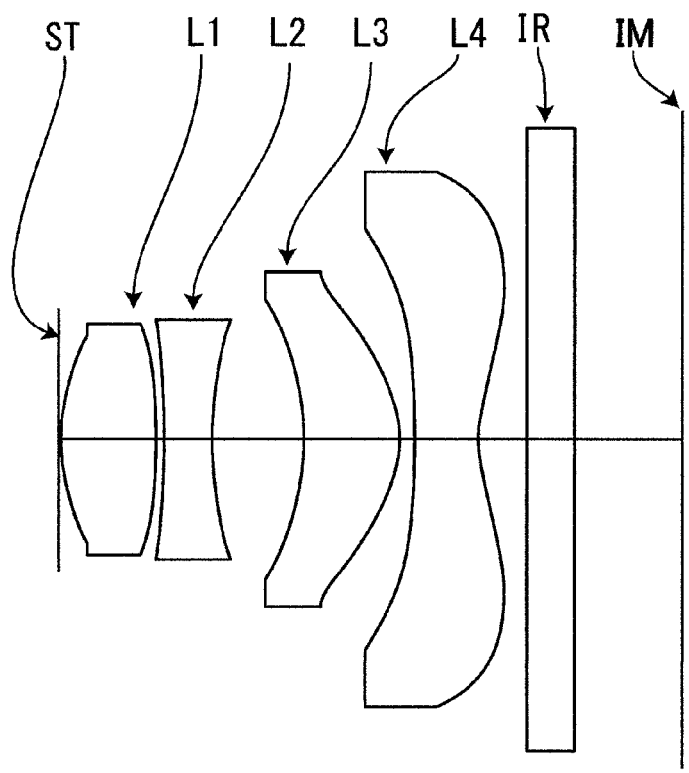
FIG. 3 is a cross-sectional view of the image pickup lens for the solid-state image pickup element related to embodiment 2(a) and embodiment 2(b) as a second embodiment.
Figure 4:
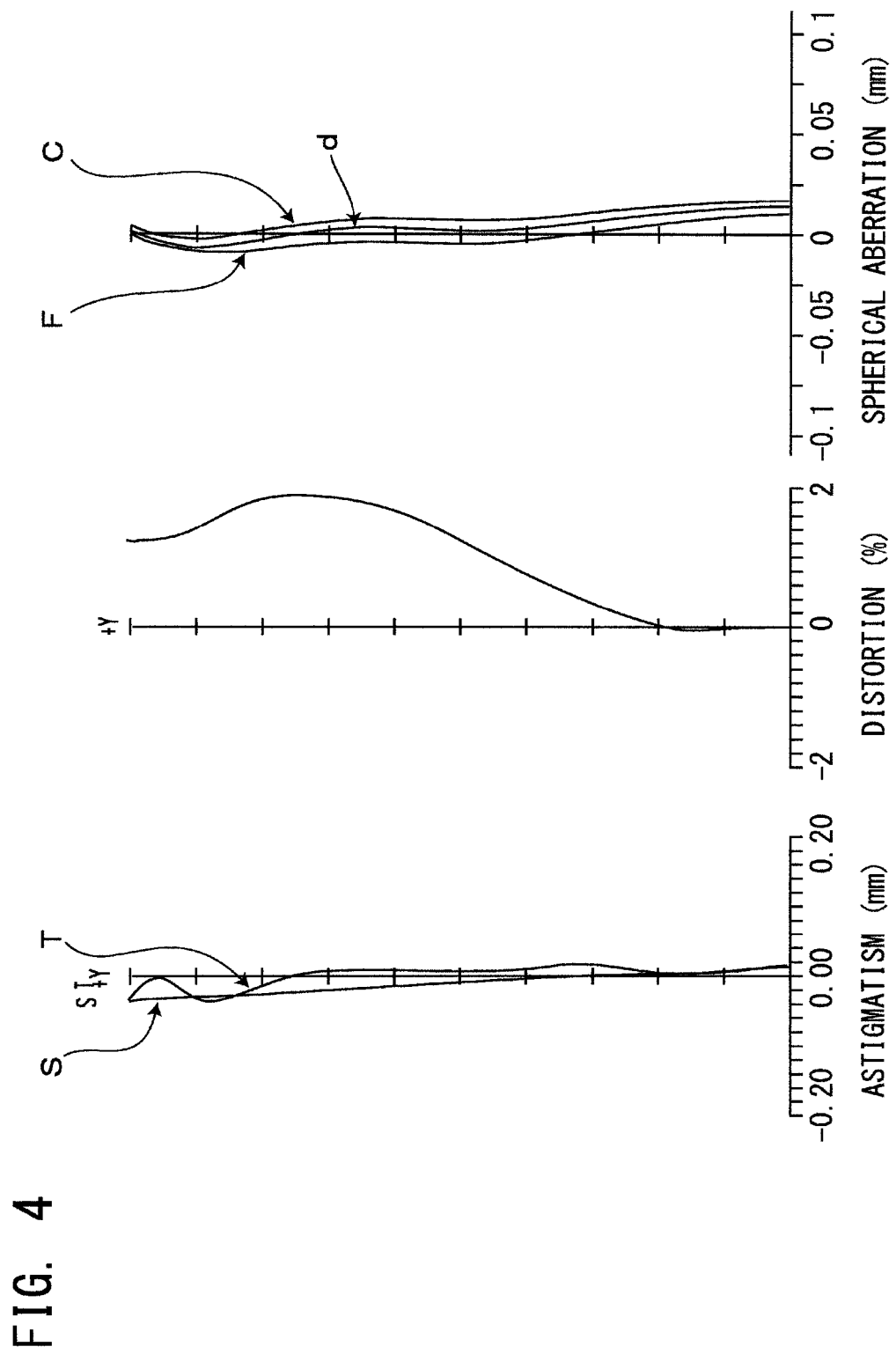
FIG. 4 shows various aberration diagrams which the image pickup lens of the solid-state image pickup element of the second embodiment of the present invention aims to achieve.

The numerical data of the image pickup lens of the embodiment 2(a) of the second embodiment is shown in Table 2. Further, FIG. 3 is a cross-sectional view of the image pickup lens, and FIG. 4 shows various aberration diagrams.

TABLE 2 f = 3.254 F = 2.39

| Surface Number | r | d | nd | νd | K |
|---|---|---|---|---|---|
| 1(ST) | 1.390283 | 0.6 | 1.534383 | 56.2012 | 0 |
| 2 | −3.36177 | 0.05 | | | 0 |
| 3 | −3.40699 | 0.3 | 1.614220 | 25.5765 | 0 |
| 4 | 4.860116 | 0.571 | | | 0 |
| 5 | −2.0427 | 0.604 | 1.544135 | 55.9763 | 0 |
| 6 | −0.74176 | 0.097 | | | 0 |
| 7 | −66.6666 | 0.4 | 1.534383 | 56.2012 | −0.60024 |
| 8 | 0.930527 | 0.3 | | | 0 |

TABLE 2-continued f = 3.254 F = 2.39

| | | | | | | |
|---|---|---|---|---|---|---|
| 9 | Infinity | 0.3 | | 1.516798 | 64.1983 | −7.42076 |
| 10 | Infinity | 0.692804 | | | | 0 |

| Surface Number | A4 | A6 | A8 | A10 | A12 | A14 | A16 |
|---|---|---|---|---|---|---|---|
| 1(ST) | −0.02193 | −0.01957 | −0.186564 | 0.736126 | −1.94079 | 1.800171 | 0 |
| 2 | 0.233877 | −0.82902 | 0.133872 | 0.616611 | 0.088397 | −0.75814 | 0 |
| 3 | 0.40175 | −0.99147 | 0.064008 | 3.737553 | −8.71176 | 8.06443 | 0 |
| 4 | 0.231036 | −0.11402 | −1.25906 | 5.073 | −7.88182 | 4.95788 | 0 |
| 5 | −0.00314 | −0.06925 | −0.22973 | 0.500472 | 0.545578 | −2.42023 | 0 |
| 6 | 0.699389 | −1.18383 | 1.719871 | −1.26434 | 0.441837 | 0 | 0 |
| 7 | −0.15423 | −0.07843 | 0.250205 | −0.2117 | 0.080131 | −0.01123 | 0 |
| 8 | −0.21551 | 0.216347 | −0.20344 | 0.130067 | −0.05224 | 0.01020 | −5.13E−04 |

The numerical data of the image pickup lens of the embodiment 2(b) of the second embodiment is shown in Table 6. Further, FIG. 3 is a cross-sectional view of the image pickup lens, and FIG. 4 shows various aberration diagrams.

TABLE 6 f = 3.254 F = 2.39 ω = 34.7062°

| Surface Number | r | d | nd | νd | K |
|---|---|---|---|---|---|
| 1(ST) | 1.390283 | 0.6 | 1.534622 | 56.1603 | 0 |
| 2 | −3.361771 | 0.05 | | | 0 |
| 3 | −3.406991 | 0.3 | 1.61422 | 25.5765 | 0 |
| 4 | 4.860116 | 0.571 | | | 0 |
| 5 | −2.042695 | 0.604 | 1.544135 | 55.9763 | 0 |
| 6 | −0.741764 | 0.097 | | | −0.600242 |
| 7 | −66.6666 | 0.4 | 1.534622 | 56.1603 | 0 |
| 8 | 0.930527 | 0.3 | | | −7.420764 |
| 9 | Infinity | 0.3 | 1.516798 | 64.1983 | 0 |
| 10 | Infinity | 0.6928044 | | | 0 |

| Surface Number | A4 | A6 | A8 | A10 | A12 | A14 | A16 |
|---|---|---|---|---|---|---|---|
| 1(ST) | −0.021934 | −0.017794 | −0.207293 | 0.7361262 | −1.940794 | 1.8001707 | −0.866923 |
| 2 | 0.233877 | −0.753654 | 0.1487462 | 0.6166109 | 0.0883973 | −0.758143 | 0 |
| 3 | 0.4017497 | −0.99147 | 0.0711202 | 3.7375529 | −8.711756 | 11.057563 | −5.775434 |
| 4 | 0.2310361 | −0.114023 | −1.259055 | 5.0729995 | −7.881817 | 4.9578771 | 0 |
| 5 | −0.003139 | −0.069247 | −0.229727 | 0.5004715 | 0.5455783 | −2.420227 | 1.7866983 |
| 6 | 0.6993895 | −1.18383 | 1.7198708 | −1.264343 | 0.441837 | 0 | 0 |
| 7 | −0.154228 | −0.078433 | 0.2502051 | −0.211705 | 0.0801314 | −0.011232 | 0 |
| 8 | −0.215513 | 0.2163473 | −0.203441 | 0.1300665 | −0.05224 | 0.0115871 | −0.001089 |

Figure 13:
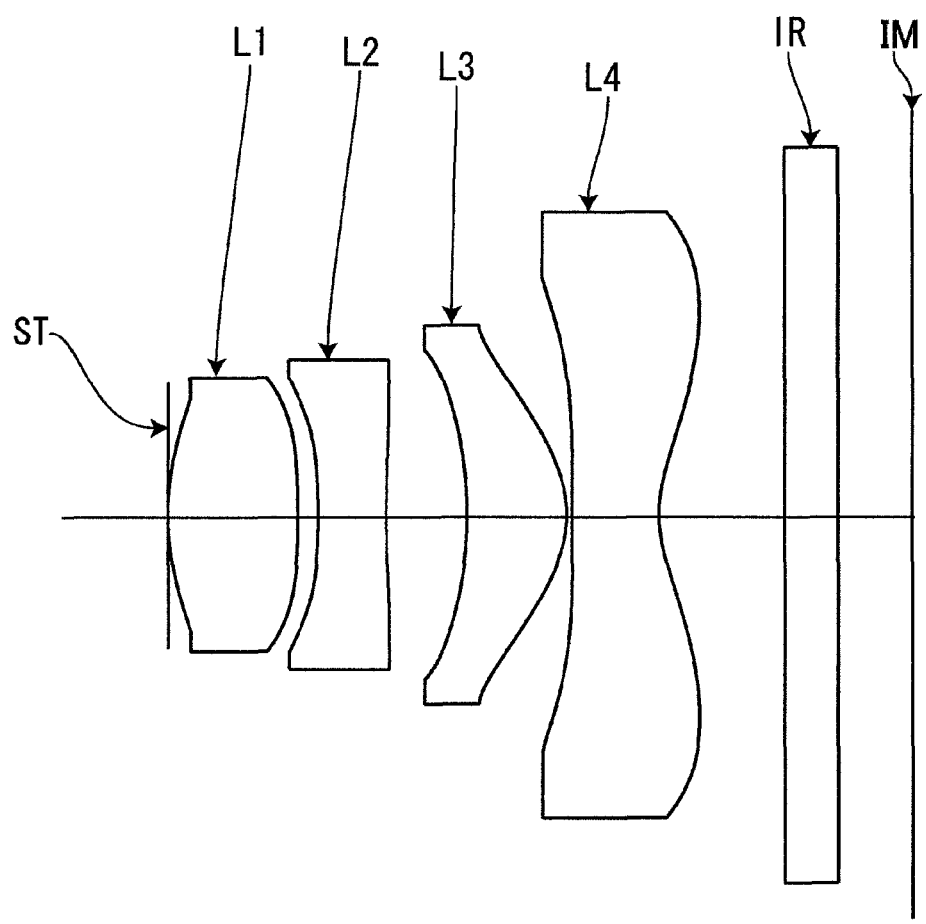
FIG. 13 is a cross-sectional view of the image pickup lens for the solid-state image pickup element related to embodiment 2(c) as the second embodiment.
Figure 14:
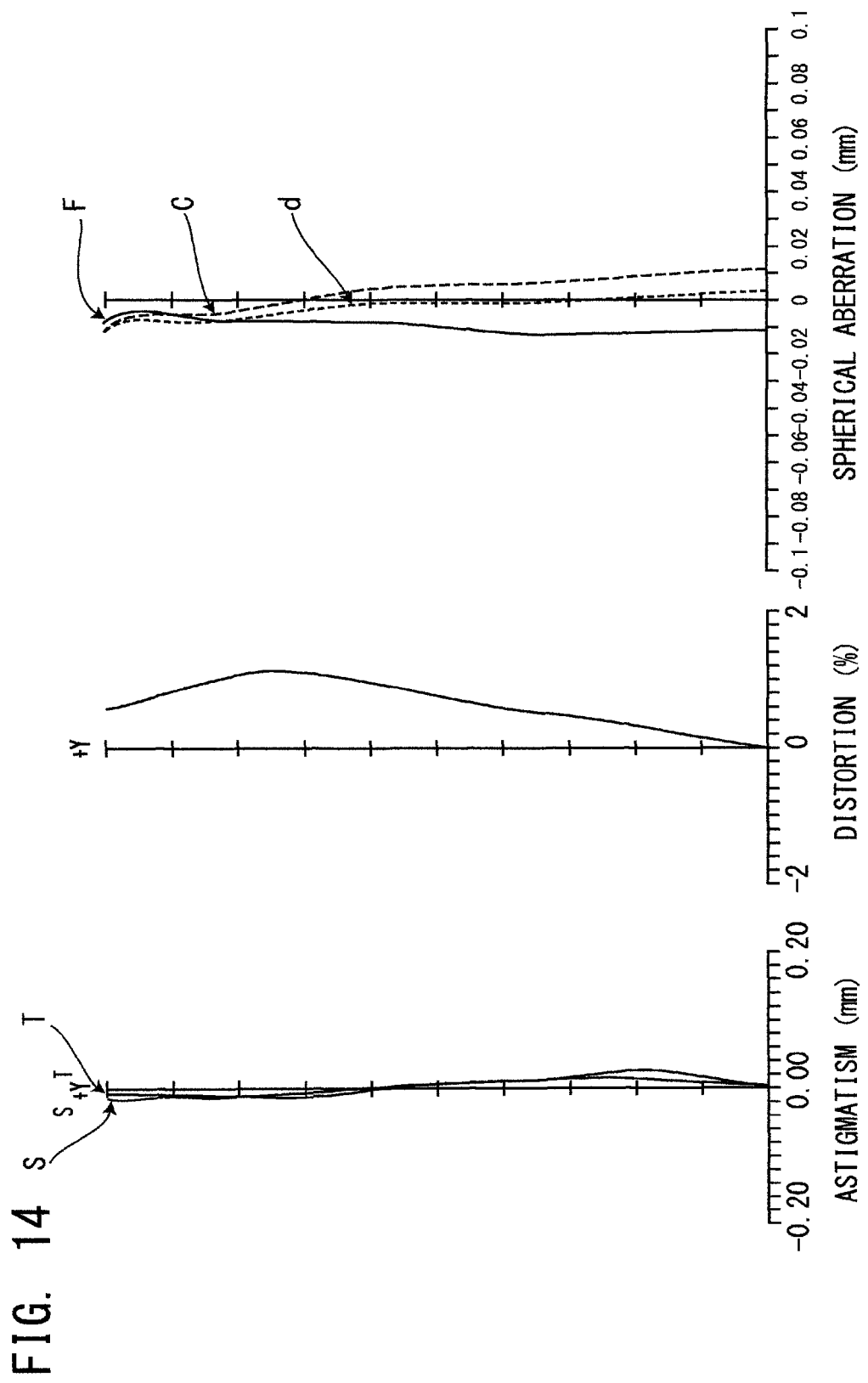
FIG. 14 shows various aberration diagrams which the image pickup lens of the solid-state image pickup element of embodiment 2(c) of the present invention aims to achieve.

The numerical data of the image pickup lens of the embodiment 2(c) of the second embodiment is shown in Table 10. Further, FIG. 13 is a cross-sectional view of the image pickup lens, and FIG. 14 shows various aberration diagrams.

TABLE 10 f = 3.24 F = 2.41 ω = 35.15°

| Surface Number | r | d | nd | νd | K |
|---|---|---|---|---|---|
| 1(ST) | 1.6995 | 0.723 | 1.5346 | 56.2 | −1.791 |
| 2 | −5.8708 | 0.116 | | | 0 |
| 3 | −4.4436 | 0.379 | 1.6142 | 25.6 | 0 |
| 4 | 8.2306 | 0.45 | | | −29.55 |
| 5 | −2.1959 | 0.559 | 1.5441 | 56.0 | 0.71 |
| 6 | −0.6198 | 0.03 | | | −3.837 |
| 7 | −100 | 0.483 | 1.5346 | 56.2 | 0 |
| 8 | 0.7354 | 0.7 | | | −7.114 |
| 9 | Infinity | 0.3 | 1.5168 | 64.2 | 0 |
| 10 | Infinity | 0.413256582 | | | 0 |

TABLE 10-continued f = 3.24 F = 2.41 ω = 35.15°

| Surface Number | A4 | A6 | A8 | A10 | A12 | A14 | A16 |
|---|---|---|---|---|---|---|---|
| 1 | 2.221E−02 | −1.026E−01 | 1.933E−01 | −4.347E−01 | 0.000E+00 | 0.000E+00 | 0.000E+00 |
| 2 | −2.926E−01 | −1.544E−01 | 3.067E−01 | −2.089E−01 | 0.000E+00 | 0.000E+00 | 0.000E+00 |
| 3 | −3.325E−01 | −1.554E−01 | 5.505E−01 | −1.370E−01 | 0.000E+00 | 0.000E+00 | 0.000E+00 |
| 4 | −6.048E−02 | −9.395E−04 | 9.007E−02 | −1.423E−01 | 8.051E−02 | 0.000E+00 | 0.000E+00 |
| 5 | 6.936E−02 | −4.231E−01 | 2.236E+00 | −6.091E+00 | 8.765E+00 | −6.571E+00 | 1.974E+00 |
| 6 | −3.150E−01 | 5.549E−01 | −5.490E−01 | 3.037E−01 | −6.809E−03 | −6.093E−02 | 2.144E−02 |
| 7 | −7.214E−02 | 3.640E−03 | 5.307E−03 | 0.000E+00 | 0.000E+00 | 0.000E+00 | 0.000E+00 |
| 8 | −1.468E−01 | 1.121E−01 | −7.492E−02 | 3.249E−02 | −8.854E−03 | 1.352E−03 | −8.878E−05 |

[Embodiment 3]

Figure 5:
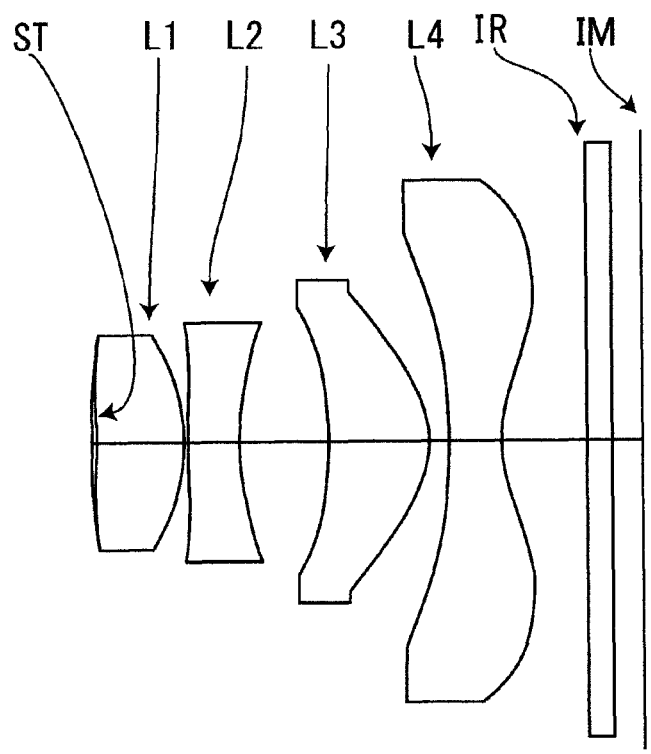
FIG. 5 is a cross-sectional view of the image pickup lens for the solid-state image pickup element related to embodiment 3(a) and embodiment 3(b) as a third embodiment.
Figure 6:
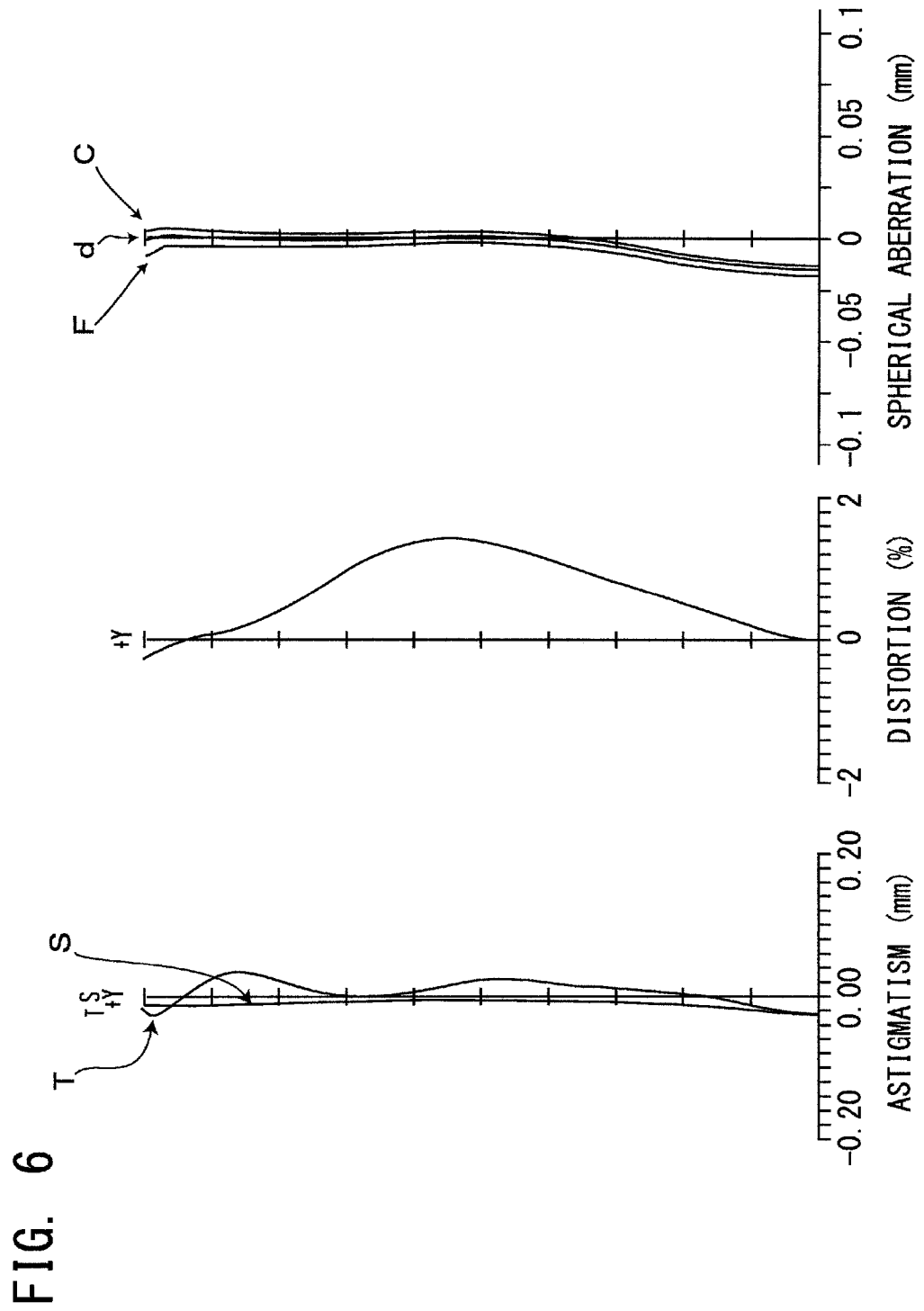
FIG. 6 shows various aberration diagrams which the image pickup lens of the solid-state image pickup element of the third embodiment of the present invention aims to achieve.

The numerical data of the image pickup lens of the embodiment 3(a) of the third embodiment is shown in Table 3. Further, FIG. 5 is a cross-sectional view of the image pickup lens, and FIG. 6 shows various aberration diagrams.

TABLE 3 f = 2.407 F = 2.438

| Surface Number | r | d | nd | νd | K |
|---|---|---|---|---|---|
| 1(ST) | Infinity | −0.04 | | | 0 |
| 2 | 1.828655 | 0.54 | 1.534383 | 56.2012 | 4.097046 |
| 3 | −1.44833 | 0.03 | | | −19.516 |
| 4 | −70 | 0.29 | 1.614220 | 25.5765 | 0 |
| 5 | 1.536613 | 0.508 | | | −10.5384 |
| 6 | −3.01735 | 0.581 | 1.544135 | 55.9763 | −121.563 |
| 7 | −0.55374 | 0.121 | | | −2.90948 |
| 8 | −4.13234 | 0.3 | 1.534383 | 56.0201 | 0 |
| 9 | 0.672351 | 0.5 | | | −7.15938 |
| 10 | Infinity | 0.145 | 1.516798 | 64.1983 | 0 |
| 11 | Infinity | 0.168903 | | | 0 |

| Surface Number | A4 | A6 | A8 | A10 | A12 | A14 | A16 |
|---|---|---|---|---|---|---|---|
| 2 | −0.20649 | −0.38754 | −0.26282 | −1.32651 | −0.43768 | 0 | 0 |
| 3 | −0.92599 | 1.47068 | −1.53800 | −0.58265 | 0.85756 | 0 | 0 |
| 4 | −0.15677 | 0.20864 | 1.14377 | −1.76902 | 0.31215 | 0 | 0 |
| 5 | 0.15677 | −0.30617 | 0.17395 | 1.051311 | −1.80868 | 0 | 0 |
| 6 | −0.68146 | 1.85907 | −2.91392 | −0.58773 | 2.318004 | 4.999694 | 0 |
| 7 | −0.59688 | 1.16458 | −1.10635 | −0.03345 | 0.365374 | 0.276374 | 0 |
| 8 | −0.08277 | 0.04511 | −0.00448 | 0 | 0 | 0 | 0 |
| 9 | −0.18745 | 0.12228 | −0.07426 | 0.025804 | −0.00498 | 0.000423 | 0 |

The numerical data of the image pickup lens of the embodiment 3(b) of the third embodiment is shown in Table 7. Further, FIG. 5 is a cross-sectional view of the image pickup lens, and FIG. 6 shows various aberration diagrams.

TABLE 7 f = 2.407 F = 2.538 ω = 36.3638°

| Surface Number | r | d | nd | νd | K |
|---|---|---|---|---|---|
| 1(ST) | Infinity | −0.04 | | | 0 |
| 2 | 1.828655 | 0.54 | 1.534622 | 56.1603 | 1.097046 |
| 3 | −1.448327 | 0.03 | | | −18.516 |
| 4 | −70 | 0.29 | 1.61422 | 25.5765 | 0 |
| 5 | 1.536613 | 0.508 | | | −10.53838 |
| 6 | −3.017346 | 0.581 | 1.544135 | 55.9763 | −121.5627 |
| 7 | −0.553742 | 0.121 | | | −3.909484 |
| 8 | −4.132343 | 0.3 | 1.534622 | 56.1603 | 0 |
| 9 | 0.672351 | 0.5 | | | −7.159382 |
| 10 | Infinity | 0.145 | 1.516798 | 64.1983 | 0 |
| 11 | Infinity | 0.1689028 | | | 0 |

TABLE 7-continued f = 2.407 F = 2.538 ω = 36.3638°

| Surface Number | A4 | A6 | A8 | A10 | A12 | A14 | A16 |
|---|---|---|---|---|---|---|---|
| 2 | −0.187716 | −0.352317 | −0.292021 | −1.326514 | −0.437678 | 0 | 0 |
| 3 | −0.841805 | 1.3369839 | −1.708886 | −0.582648 | 0.8575601 | 0 | 0 |
| 4 | −0.261876 | 0.1896679 | 1.2708499 | −1.769024 | 0.3121499 | 0 | 0 |
| 5 | 0.1425138 | −0.278336 | 0.1932812 | 1.0513113 | −1.808684 | 0 | 0 |
| 6 | −0.68146 | 1.8590665 | −2.649019 | −0.587734 | 2.3180044 | 4.9996944 | −7.723394 |
| 7 | −0.596883 | 1.164584 | −1.005769 | −0.033447 | 0.3653742 | 0.2763737 | −0.226011 |
| 8 | −0.082771 | 0.0451084 | −0.004477 | 0 | 0 | 0 | 0 |
| 9 | −0.197447 | 0.122276 | −0.074262 | 0.0258038 | −0.004979 | 0.0004232 | −6.72E−05 |

Figure 15:
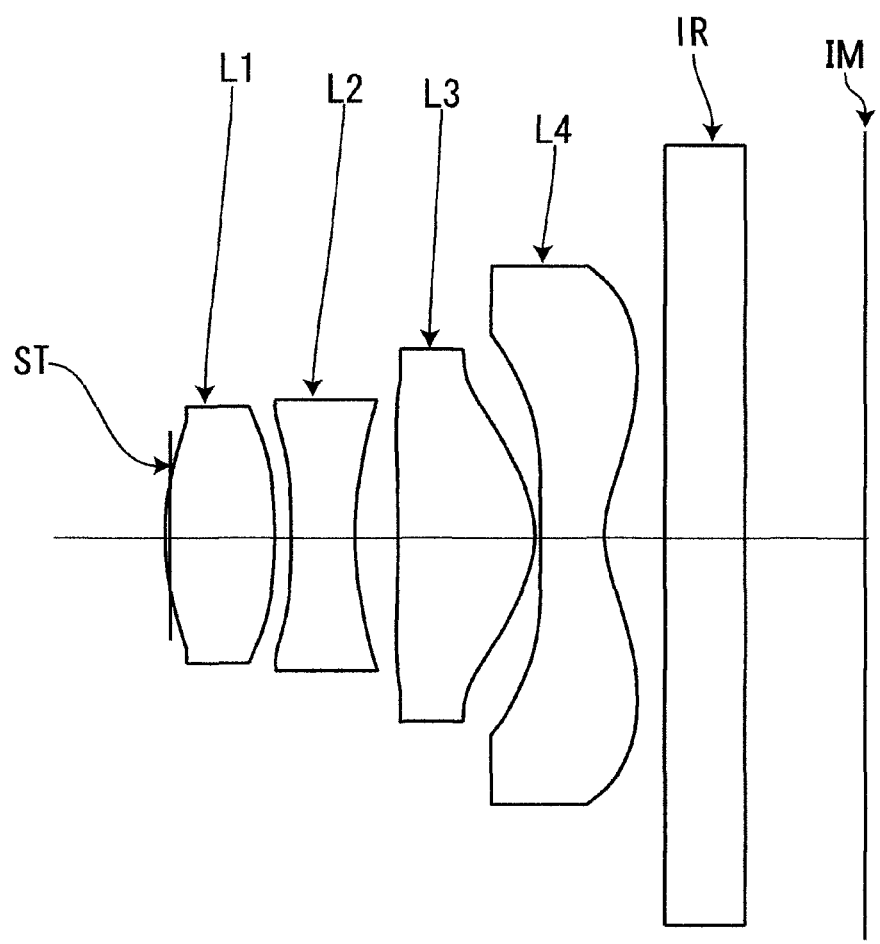
FIG. 15 is a cross-sectional view of the image pickup lens for the solid-state image pickup element related to embodiment 3(c) as the third embodiment.
Figure 16:
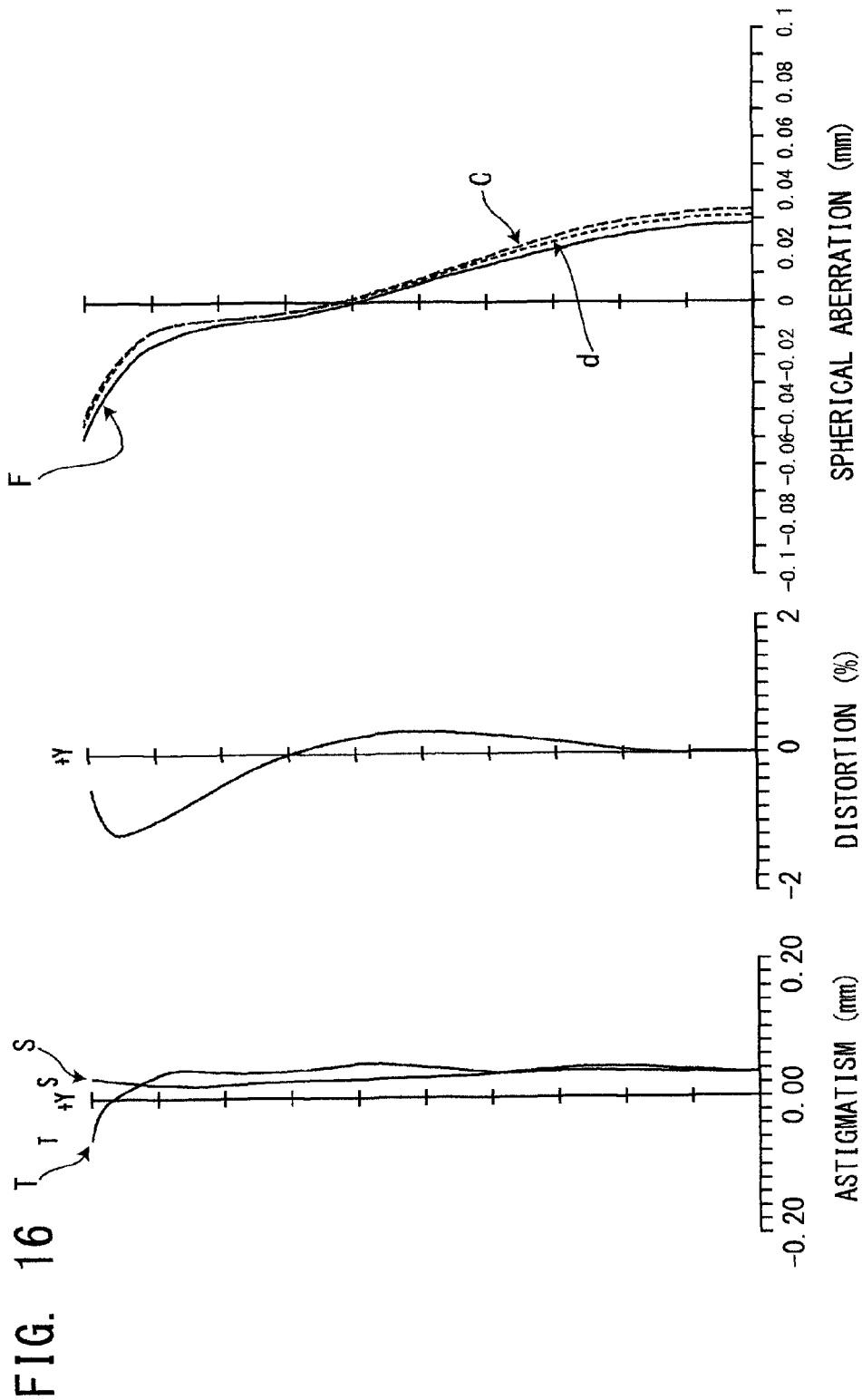
FIG. 16 shows various aberration diagrams which the image pickup lens of the solid-state image pickup element of embodiment 3(c) of the present invention aims to achieve.

The numerical data of the image pickup lens of the embodiment 3(c) of the third embodiment is shown in Table 11. Further, FIG. 15 is a cross-sectional view of the image pickup lens, and FIG. 16 shows various aberration diagrams.

TABLE 11 f = 1.96 F = 2.35 ω = 36.23°

| Surface Number | r | d | nd | vd | K |
|---|---|---|---|---|---|
| 1(ST) | Infinity | −0.02 | | | 0 |
| 2 | 1.1004 | 0.412 | 1.5346 | 56.2 | −2.511 |
| 3 | −2.1278 | 0.062 | | | 0.1503 |
| 4 | −4.0183 | 0.24 | 1.6142 | 25.6 | −29.66 |
| 5 | 1.5551 | 0.161 | | | 5.728 |
| 6 | −4.0814 | 0.513 | 1.5441 | 56.0 | 23.38 |
| 7 | −0.3904 | 0.02 | | | −4.273 |
| 8 | −85 | 0.24 | 1.5346 | 56.2 | 0 |
| 9 | 0.4239 | 0.225 | | | −6.928 |
| 10 | Infinity | 0.3 | 1.5168 | 64.2 | 0 |
| 11 | Infinity | 0.41632937 | | | 0 |

| Surface Number | A4 | A6 | A8 | A10 | A12 | A14 | A16 |
|---|---|---|---|---|---|---|---|
| 2 | 1.623E−01 | −7.011E−01 | 2.302E−01 | −4.852E+01 | 1.700E+02 | 0.000E+00 | 0.000E+00 |
| 3 | −7.668E−01 | −1.279E+00 | 5.115E+00 | −1.129E+01 | 6.717E+01 | 0.000E+00 | 0.000E+00 |
| 4 | −1.113E+00 | −1.510E+00 | 1.314E+01 | −1.247E+00 | 4.368E+01 | 0.000E+00 | 0.000E+00 |
| 5 | −4.084E−01 | −6.651E−02 | −1.706E+00 | 5.534E+00 | 8.884E+00 | −5.674E+01 | 0.000E+00 |
| 6 | 4.453E−01 | −4.017E−01 | 2.886E+00 | −4.203E+00 | −7.417E+00 | 4.262E+01 | −7.124E+01 |
| 7 | −8.588E−01 | 2.081E+00 | −2.287E+00 | 5.416E+00 | 3.477E+00 | −3.846E+00 | −1.944E+01 |
| 8 | −5.138E−01 | −2.253E+00 | 9.620E+00 | −1.459E+01 | 1.022E+01 | −6.805E+00 | 5.224E+00 |
| 9 | −7.283E−01 | 9.636E−01 | −9.436E−01 | 4.129E−01 | 4.873E−02 | −1.532E−01 | 3.327E−02 |

[Embodiment 4]

Figure 7:
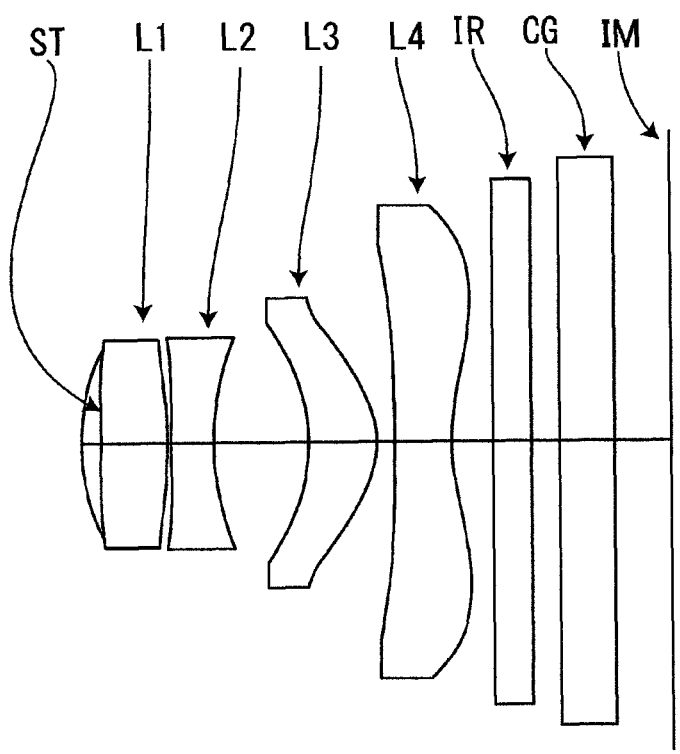
FIG. 7 is a cross-sectional view of the image pickup lens for the solid-state image pickup element related to embodiment 4(a) and embodiment 4(b) as a fourth embodiment.
Figure 8:
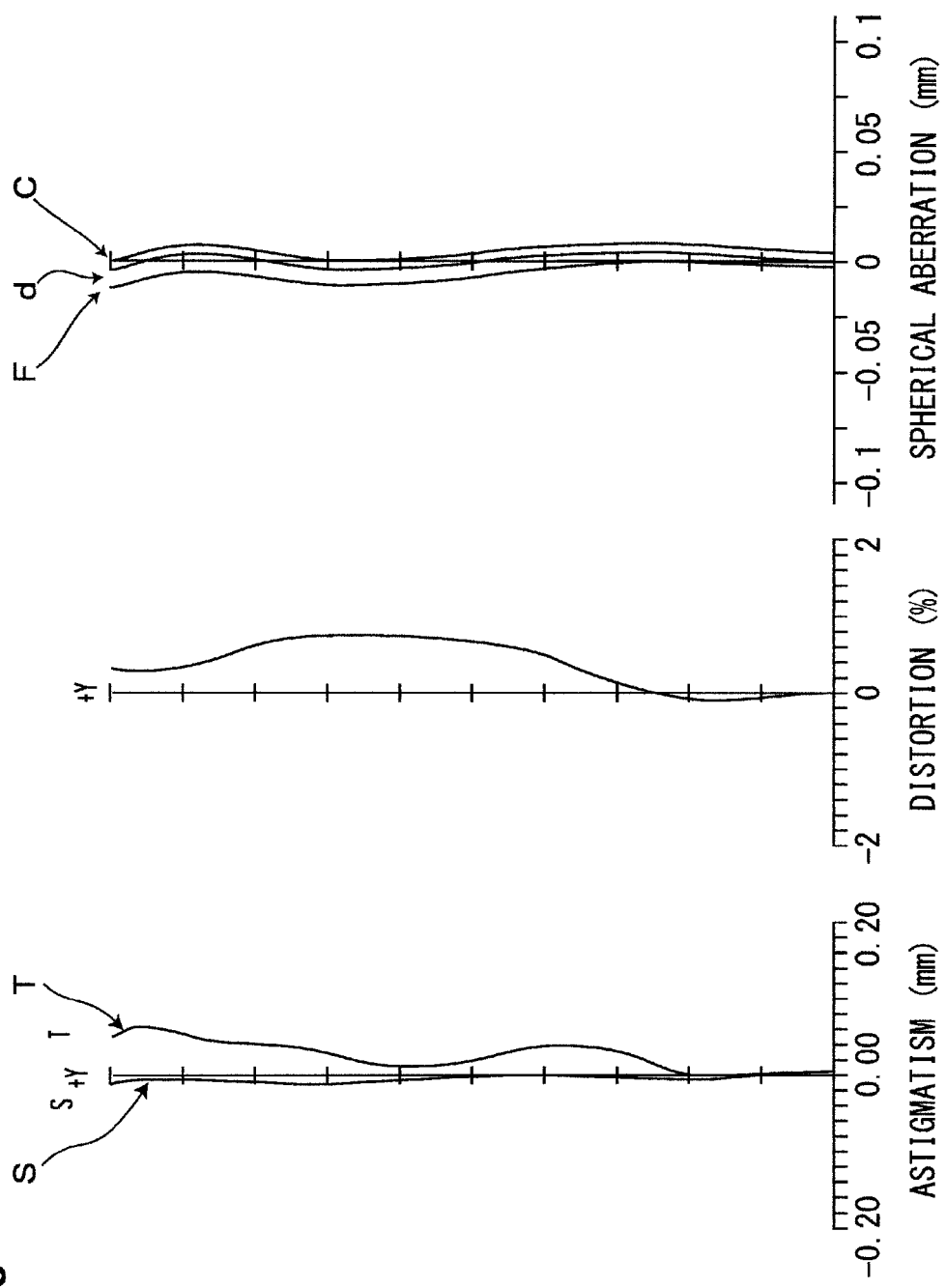
FIG. 8 shows various aberration diagrams which the image pickup lens of the solid-state image pickup element of the fourth embodiment of the present invention aims to achieve.

The numerical data of the image pickup lens of the embodiment 4(a) of the fourth embodiment is shown in Table 4. Further, FIG. 7 is a cross-sectional view of the image pickup lens, and FIG. 8 shows various aberration diagrams. Reference character CG denotes a cover glass.

TABLE 4 f = 3.604 F = 2.588

| Surface Number | r | d | nd | vd | K |
|---|---|---|---|---|---|
| 1(ST) | Infinity | −0.15 | | | 0 |
| 2 | 1.490339 | 0.6614 | 1.534383 | 56.2012 | 0 |
| 3 | −2.32496 | 0.03 | | | 0 |
| 4 | −4.04243 | 0.3 | 1.583716 | 30.1305 | 0 |
| 5 | 2.201408 | 0.701 | | | 0 |
| 6 | −1.58364 | 0.5085 | 1.544135 | 55.9763 | 0 |
| 7 | −0.75125 | 0.1164 | | | −0.98883 |
| 8 | −42.7457 | 0.4374 | 1.534383 | 56.2012 | 0 |
| 9 | 1.271466 | 0.3 | | | −10.474 |
| 10 | Infinity | 0.3 | 1.516798 | 64.1983 | 0 |

TABLE 4-continued f = 3.604 F = 2.588

| | | | | | | |
|---|---|---|---|---|---|---|
| 11 | Infinity | 0.2 | | | | 0 |
| 12 | Infinity | 0.4 | 1.516798 | 64.1983 | | 0 |
| 13 | Infinity | 0.449494 | | | | 0 |

| Surface Number | A4 | A6 | A8 | A10 | A12 | A14 | A16 |
|---|---|---|---|---|---|---|---|
| 2 | −0.03366 | 0.048464 | −0.32507 | 0.270778 | −0.4332 | 0 | 0 |
| 3 | 0.428463 | −0.91385 | 1.177844 | −0.98562 | 0.707334 | 0 | 0 |
| 4 | 0.344618 | −0.8511 | 0.326252 | 0.995023 | −1.00719 | 0 | 0 |
| 5 | 0.065295 | −0.05086 | −0.14669 | 0.446358 | 0.053449 | 0 | 0 |
| 6 | −0.18815 | 0.343674 | −0.33537 | 0.064811 | 0.467736 | −0.41534 | 0 |
| 7 | 0.282785 | −0.39066 | 0.375454 | −0.07377 | −0.00674 | −0.00792 | 0 |
| 8 | −0.01521 | −0.00499 | 0.00392 | −0.00065 | 0 | 0 | 0 |
| 9 | −0.11376 | 0.057969 | −0.02729 | 0.006679 | −0.00071 | 0 | 0 |

The numerical data of the image pickup lens of the embodiment 4(b) of the fourth embodiment is shown in Table 8. Further, FIG. 7 is a cross-sectional view of the image pickup lens, and FIG. 8 shows various aberration diagrams.

TABLE 8 f = 3.604 F = 2.588 ω = 32.3156°

| Surface Number | r | d | nd | vd | K |
|---|---|---|---|---|---|
| 1(ST) | Infinity | −0.15 | | | 0 |
| 2 | 1.490339 | 0.6614 | 1.534622 | 56.1603 | 0 |
| 3 | −2.324958 | 0.03 | | | 0 |
| 4 | −4.042434 | 0.3 | 1.583716 | 30.1305 | 0 |
| 5 | 2.201408 | 0.701 | | | 0 |
| 6 | −1.583639 | 0.5085 | 1.544135 | 55.9763 | 0 |
| 7 | −0.751247 | 0.1164 | | | −0.988826 |
| 8 | −42.74573 | 0.4374 | 1.534622 | 56.1603 | 0 |
| 9 | 1.271466 | 0.3 | | | −10.47395 |
| 10 | Infinity | 0.3 | 1.516798 | 64.1983 | 0 |
| 11 | Infinity | 0.2 | | | 0 |
| 12 | Infinity | 0.4 | 1.516798 | 64.1983 | 0 |
| 13 | Infinity | 0.4494938 | | | 0 |

| Surface Number | A4 | A6 | A8 | A10 | A12 | A14 | A16 |
|---|---|---|---|---|---|---|---|
| 2 | −0.033658 | 0.0484639 | −0.225074 | 0.2707781 | −0.433202 | 0.250519 | 0 |
| 3 | 0.3284626 | −0.913849 | 1.0778441 | −0.985615 | 0.7073337 | 0 | 0 |
| 4 | 0.3446185 | −0.851097 | 0.4262523 | 0.9950231 | −1.007192 | 0.3421772 | 0 |
| 5 | 0.0652949 | −0.05086 | −0.146686 | 0.446358 | 0.0534493 | −0.472957 | 0.183748 |
| 6 | −0.188147 | 0.3436735 | −0.335366 | 0.0648112 | 0.4677363 | −0.415341 | 0 |
| 7 | 0.2827855 | −0.39066 | 0.375454 | −0.073769 | −0.006741 | −0.007921 | 0 |
| 8 | −0.015208 | −0.004987 | 0.0039201 | −0.000652 | 0 | 0 | 0 |
| 9 | −0.113765 | 0.0579687 | −0.027291 | 0.0066793 | −0.00071 | 0 | 0 |

Figure 17:
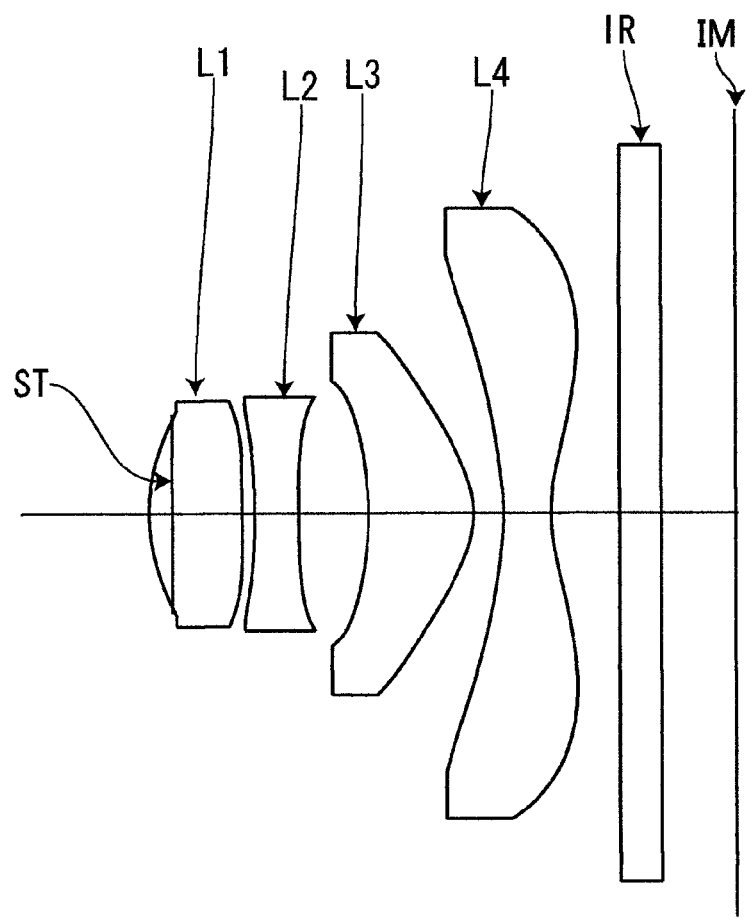
FIG. 17 is a cross-sectional view of the image pickup lens for the solid-state image pickup element related to embodiment 4(c) as the fourth embodiment.

The numerical data of the image pickup lens of the embodiment 4(c) of the fourth embodiment is shown in Table 12. Further, FIG. 17 is a cross-sectional view of the image pickup lens, and FIG. 18 shows various aberration diagrams.

TABLE 12 f = 3.51 F = 2.41 ω = 39.07°

| Surface Number | r | d | nd | vd | K |
|---|---|---|---|---|---|
| 1(ST) | Infinity | −0.162 | | | 0 |
| 2 | 1.4359 | 0.664 | 1.5346 | 56.2 | −1.079 |
| 3 | 50.9998 | 0.085 | | | −97 |
| 4 | −7.9002 | 0.317 | 1.6355 | 23.9 | −26.19 |
| 5 | 11.0299 | 0.497 | | | 0.3248 |
| 6 | −2.6488 | 0.749 | 1.5441 | 56.0 | −1.66 |
| 7 | −0.7212 | 0.212 | | | −3.66123 |
| 8 | −2.0461 | 0.341 | 1.5346 | 56.2 | −38.25 |
| 9 | 1.2353 | 0.485 | | | −10.199 |

TABLE 12-continued f = 3.51 F = 2.41 ω = 39.07°

| | | | | | |
|---|---|---|---|---|---|
| 10 | Infinity | 0.3 | 1.5168 | 64.2 | 0 |
| 11 | Infinity | 0.54697273 | | | 0 |

| Surface Number | A4 | A6 | A8 | A10 | A12 | A14 | A16 |
|---|---|---|---|---|---|---|---|
| 2 | 1.951E−02 | 1.089E−02 | 1.176E−02 | −1.615E−01 | 0.000E+00 | 0.000E+00 | 0.000E+00 |
| 3 | −1.662E−01 | −2.397E−01 | 3.418E−01 | −1.517E−01 | 0.000E+00 | 0.000E+00 | 0.000E+00 |
| 4 | −9.826E−02 | −1.872E−01 | 3.005E−01 | 2.687E−01 | −2.657E−01 | 0.000E+00 | 0.000E+00 |
| 5 | 1.144E−01 | −8.212E−02 | 2.459E−01 | −1.522E−01 | 9.541E−02 | 3.205E−02 | 0.000E+00 |
| 6 | −4.829E−02 | 1.162E−02 | 3.507E−01 | −9.959E−01 | 8.245E−01 | −3.222E−02 | −2.362E−01 |
| 7 | −1.604E−01 | 2.281E−01 | −1.421E−01 | 3.722E−02 | 3.641E−03 | −7.821E−03 | 2.056E−03 |
| 8 | −3.459E−02 | 7.723E−03 | −1.414E−04 | −5.914E−05 | 0.000E+00 | 0.000E+00 | 0.000E+00 |
| 9 | −8.064E−02 | 3.968E−02 | −1.711E−02 | 4.791E−03 | −8.654E−04 | 8.924E−05 | −4.009E−06 |

With respect to the first embodiment to the fourth embodiment, the values corresponding to the conditional expression (1) through the conditional expression (9) are shown in Table 13 below.

TABLE 13

| | Embodiment 1(a) | Embodiment 2(a) | Embodiment 3(a) | Embodiment 4(a) | Embodiment 1(b) | Embodiment 2(b) |
|---|---|---|---|---|---|---|
| Condition equation (1) | −0.22692 | −0.41356 | −1.2626 | −0.64102 | −0.22692 | −0.41356 |
| Condition equation (2) | 0.660625 | 0.36313 | 0.18352 | 0.47438 | 0.66062 | 0.36313 |
| Condition equation (3) | −0.78379 | −0.98845 | −1.01539 | −0.66575 | −0.78340 | −0.98722 |
| Condition equation (4) | −0.81287 | −0.52644 | −0.43976 | −0.63866 | −0.81246 | −0.52577 |
| Condition equation (5) | −0.00235 | −0.01396 | −0.1627 | −0.02974 | −0.00235 | −0.01396 |
| Condition equation (6) | 0.501196 | 0.591359 | 0.66626 | 0.50167 | 0.50095 | 0.59062 |
| Condition equation (7) | 0.866736 | 0.565293 | 0.478049 | 0.599753 | 0.86631 | 0.56459 |
| Condition equation (8) | −0.24566 | −1.42651 | −0.02195 | −0.54457 | −0.24566 | −1.42651 |
| Condition equation (9) | 1.10212 | 1.166528 | 1.302094 | 1.153949 | 1.10520 | 1.17091 |

| | Embodiment 3(b) | Embodiment 4(b) | Embodiment 1(c) | Embodiment 2(c) | Embodiment 3(c) | Embodiment 4(c) |
|---|---|---|---|---|---|---|
| Condition equation (1) | −1.26260 | −0.64102 | −0.0663687 | −0.2894811 | −0.5171539 | 0.0281557 |
| Condition equation (2) | 0.18352 | 0.47438 | 0.87803212 | 0.28223353 | 0.09565345 | 0.2722829 |
| Condition equation (3) | −1.01393 | −0.66505 | −0.8360215 | −1.4353663 | −0.9180283 | −2.0428 |
| Condition equation (4) | −0.43914 | −0.63800 | −1.176257 | −0.4212556 | −0.4028911 | −0.394711 |
| Condition equation (5) | −0.16270 | −0.02974 | −0.0318632 | −0.0073543 | −0.0049871 | −0.603759 |
| Condition equation (6) | 0.66530 | 0.50115 | 0.49921333 | 0.78798203 | 0.72574111 | 0.78088 |
| Condition equation (7) | 0.47737 | 0.59913 | 1.49 | 0.43587741 | 0.38659694 | 0.4547294 |
| Condition equation (8) | −0.02195 | −0.54457 | −0.0502647 | −1.8522567 | −0.3870045 | −1.396163 |
| Condition equation (9) | 1.30094 | 1.15536 | 1.0384488 | 1.25086062 | 1.28145527 | 1.1656874 |

The effects of the present invention are as follows.

According to the present invention, it becomes easy to secure the off-axial performance, by arranging the aperture stop closest to the object side, and by giving a role to the fourth lens of the four-lens configuration which was not present in the conventional three-lens configuration.

According to the present invention, by arranging the lens of the negative power as the fourth lens, it becomes easier to correct a chromatic aberration of magnification, which was insufficiently corrected in the conventional three-lens configuration, so that it is possible to improve performance.

Further, in the present invention, by arranging the first lens having the positive refractive power with the convex surface facing the object side in the vicinity of the optical axis, the second lens of the biconcave lens shape facing the concave surfaces to the object side and the image side in the vicinity of the optical axis, the third lens of the meniscus shape having the positive refractive power with the convex surface facing the image side in the vicinity of the optical axis, and the fourth lens of the biconcave lens shape facing the concave surfaces to the object side and the image side in the vicinity of the optical axis, and by optimizing a distribution of the refractive power of each lens, it becomes possible to correct various aberrations favorably, and to improve performance and downsize the lens. Moreover, by using the resin material, it becomes possible to reduce cost.

In the present invention, it becomes easy to correct the optimized chromatic aberration, by making the negative power of the second lens and the fourth lens large, and by making the positive power of the first lens and the third lens large according to the negative power of the second lens and the fourth lens and also making fine adjustments thereto.

What is claimed is:

1. An image pickup lens for a solid-state image pickup element, comprising, in order from an object side, a first lens having a positive refractive power with a convex surface facing the object side in the vicinity of an optical axis, a second lens of a biconcave lens shape facing concave surfaces to the object side and an image side in the vicinity of the optical axis, a third lens of a meniscus shape having a positive refractive power with a convex surface facing the image side in the vicinity of the optical axis, and a fourth lens of a biconcave lens shape facing concave surfaces to the object side and the image side in the vicinity of the optical axis, wherein the image pickup lens satisfies the following conditional expressions (1), (2), (4), (5), (7), and (8):

$$-1.3 < r1/r2 < 0.03 \quad (1)$$

$$0.09 < r6/r5 < 1.0 \quad (2)$$

$$-0.52644 \leq f4/f < -0.35 \quad (4)$$

$$-0.16270 \leq r8/r7 \leq -0.0049871 \quad (5)$$

$$0.38659694 \leq f3/f \leq 0.565293 \quad (7)$$

$$-2.0 < r4/r3 \leq -0.02195 \quad (8)$$

where r1: a curvature radius of the object side surface of the first lens;
r2: a curvature radius of the image side surface of the first lens;
r3: a curvature radius of the object side surface of the second lens;
r4: a curvature radius of the image side surface of the second lens;
r5: a curvature radius of the object side surface of the third lens;
r6: a curvature radius of the image side surface of the third lens;
r7: a curvature radius of the object side surface of the fourth lens;
r8: a curvature radius of the image side surface of the fourth lens;

f: a composite focal length of an overall image pickup lens system;
f3: a focal length of the third lens; and
f4: a focal length of the fourth lens.

2. The image pickup lens according to claim 1, wherein an aperture stop is arranged on the object side of the first lens.

3. The image pickup lens according to claim 1, wherein the image side surface of the second lens has an aspheric shape changing uniformly without having an inflection point from a center of the lens to a periphery thereof.

4. The image pickup lens according to claim 1, wherein the object side surface of the fourth lens has an aspheric shape changing uniformly without having an inflection point from a center of the lens to a periphery thereof.

5. The image pickup lens according to claim 1, wherein the second lens further satisfies the following conditional expression (3):

$$-2.05 < f2/f < -0.5 \quad (3)$$

where
f: the composite focal length of the overall image pickup lens system; and
f2: a focal length of the second lens.

6. The image pickup lens according to claim 1, wherein the second lens and the fourth lens further satisfy the following conditional expressions (3) and (4):

$$-2.05 < f2/f < -0.5 \quad (3)$$

$$-0.52644 \leq f4/f < -0.35 \quad (4)$$

where
f: the composite focal length of the overall image pickup lens system;
f2: the focal length of the second lens; and
f4: the focal length of the fourth lens.

7. The image pickup lens according to claim 1, wherein the first lens satisfies the following conditional expression (6):

$$0.4 < f1/f < 0.8 \quad (6)$$

where
f: the composite focal length of the overall image pickup lens system; and
f1: a focal length of the first lens.

8. The image pickup lens according to claim 1, wherein the image pickup lens satisfies the following conditional expression (9), with respect to a total track length and the focal length of the image pickup lens system:

$$1.03 < L/f < 1.4 \quad (9)$$

where
L: a distance from the object side surface of the first lens to an image plane on the optical axis (air-converted distance excluding a plane-parallel glass); and
f: the composite focal length of the overall image pickup lens system.

9. The image pickup lens according to claim 1, wherein the first lens, the second lens, the third lens, and the fourth lens have at least one surface thereof formed into the aspheric shape, and are so-called plastic lenses produced from a synthetic resin material.

* * * * *